(12) United States Patent
Miyano

(10) Patent No.: US 6,674,581 B2
(45) Date of Patent: Jan. 6, 2004

(54) ZOOM LENS

(75) Inventor: Hitoshi Miyano, Kumagaya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/245,312

(22) Filed: Sep. 18, 2002

(65) Prior Publication Data

US 2003/0067689 A1 Apr. 10, 2003

(30) Foreign Application Priority Data

Sep. 27, 2001 (JP) ..................... 2001-295515

(51) Int. Cl.$^7$ ............................................ G02B 15/14
(52) U.S. Cl. ........................................ 359/688; 359/684
(58) Field of Search ........................... 359/676, 683, 359/684, 686, 688

(56) References Cited

U.S. PATENT DOCUMENTS

| | | | | |
|---|---|---|---|---|
| 4,576,445 A | * | 3/1986 | Inadome | 359/688 |
| 4,618,219 A | * | 10/1986 | Sugiura et al. | 359/688 |
| 5,515,204 A | | 5/1996 | Usui et al. | |
| 6,266,195 B1 | * | 7/2001 | Shinohara | 359/686 |
| 6,285,510 B1 | | 9/2001 | Tsutsumi | |

* cited by examiner

Primary Examiner—Georgia Epps
Assistant Examiner—Darryl J. Collins
(74) Attorney, Agent, or Firm—Arnold International; Bruce Y. Arnold

(57) ABSTRACT

A zoom lens having only four lens groups is disclosed. In order from the object side, these are: a first lens group having positive refractive power, a second lens group having negative refractive power that moves for zooming, a third lens group having negative refractive power that moves for correcting a shift in the image surface position when zooming, and a fourth lens group having positive refractive power and formed of front and rear subgroups, with the rear subgroup consisting of a single positive lens element that moves to correct for different back focus lengths that are required when the zoom lens is used in different television cameras. Various conditions are preferably satisfied in order to maintain favorable correction of spherical aberration and astigmatism even when the back focus of the zoom lens is adjusted slightly so as to compensate for manufacturing tolerances.

16 Claims, 20 Drawing Sheets

Embodiment 1

Spherical Aberration (mm)

Astigmatism (mm)

Embodiment 1
Telephoto End
F/5.23

Spherical Aberration (mm)

Embodiment 1
Telephoto End
ω=1.3°

—— S
---- T

Astigmatism (mm)

Embodiment 2
Wide-angle End
F/1.65

Spherical Aberration (mm)

Embodiment 2
Wide-angle End
$\omega=25.9°$

——— S
----- T

Astigmatism (mm)

Embodiment 2
Telephoto End
F/3.61

Spherical Aberration (mm)

Embodiment 2
Telephoto End
ω=1.2°

— S
--- T

Astigmatism (mm)

Embodiment 2
As Designed
F/1.65

Spherical Aberration (mm)

Embodiment 2
As Designed
ω=25.9°

—— S
---- T

Astigmatism (mm)

Embodiment 2
After 1 mm Shift
F/1.66

Spherical Aberration (mm)

Embodiment 2
After 1 mm Shift
ω=25.8°

—— S
---- T

Astigmatism (mm)

Embodiment 3
Wide-angle End
F/1.25

Spherical Aberration (mm)

Embodiment 3
Wide-angle End
$\omega=25.6°$

—— S
---- T

Astigmatism (mm)

Embodiment 3
Telephoto End
F/2.80

Spherical Aberration (mm)

Embodiment 3
Telephoto End
$\omega=1.2°$

—— S
---- T

Astigmatism (mm)

Prior Art Example 1
Wide-angle End
As Designed

Spherical Aberration (mm)

Prior Art Example 1
Wide-angle End
As Designed

Astigmatism (mm)

Prior Art Example 1
Wide-angle End
After 1 mm Shift

Spherical Aberration (mm)

Prior Art Example 1
Wide-angle End
After 1 mm Shift

Astigmatism (mm)

Prior Art Example 2
Wide-angle End
As Designed
F/1.65

Spherical Aberration (mm)

Prior Art Example 2
Wide-angle End
As Designed
ω=24.3°

Astigmatism (mm)

Prior Art Example 2
Wide-angle End
After 1 mm Shift
F/1.67

Spherical Aberration (mm)

Prior Art Example 2
Wide-angle End
After 1 mm Shift
ω=23.8°

Astigmatism (mm)

ZOOM LENS

BACKGROUND OF THE INVENTION

In general, the back flange length of a mount in a television camera varies among individual cameras even though they satisfy the same standard. Therefore, after a lens is mounted in a television camera, the back focus is adjusted so that the image pick-up plane of the television camera coincides with the image plane of the lens. Back focus adjustment is performed by moving one or more lens elements of a lens group in order to adjust the image plane position.

PRIOR ART EXAMPLE 1

A prior art zoom lens used in a broadcast television camera that employs a tricolor separation prism is shown in FIG. 17. This zoom lens includes an afocal part and a lens group having a complex structure that is moved for adjusting the axial position of the image plane. Therefore, aberrations are sufficiently corrected and lens performance is sufficiently maintained after the lens is moved in order to make the position of the image plane coincide with the image pick-up plane of the television camera.

As shown in FIG. 17, wherein X is the optical axis, the zoom lens of Prior Art Example 1 is formed of, in order from the object side, a first lens group I having a first lens $L_1$ through a fifth lens $L_5$, a second lens group II having a sixth lens $L_6$ through a ninth lens $L_9$, a third lens group III having a tenth lens $L_{10}$ and an eleventh lens $L_{11}$, and a fourth lens group IV having a front subgroup IVa and a rear subgroup IVb. The front subgroup IVa is formed of a twelfth lens $L_{12}$ through a fifteenth lens $L_{15}$ and the rear subgroup IVb is formed of a sixteenth lens L16 through a twenty-first lens $L_{21}$. A diaphragm stop 1 is positioned on the object side of front subgroup IVa of the fourth lens group. A tricolor separation prism 4 and a filter 2 are positioned between the rear subgroup IVb of the fourth lens group and the image plane $R_{42}$. An image sensor 3, in this instance a CCD, is provided at the image plane. The image sensor 3, tricolor separation prism 4, and filter 2 are provided in the television camera body.

Table 1 below shows the surface # in order from the object side, the radius of curvature R (in mm) of each surface, the on-axis spacing D (in mm) between surfaces, as well as the refractive index $N_e$ and Abbe number $v_e$ (both at the e-line) of the lens elements of the zoom lens of Prior Art Example 1.

TABLE 1

| # | R | D | $N_e$ | $v_e$ |
|---|---|---|---|---|
| 1 | −167.933 | 2.506 | 1.81264 | 25.2 |
| 2 | 205.525 | 5.917 | | |
| 3 | ∞ | 8.182 | 1.43496 | 94.6 |
| 4 | −123.571 | 0.116 | | |
| 5 | 284.452 | 7.902 | 1.43496 | 94.6 |
| 6 | −212.171 | 7.497 | | |
| 7 | 124.045 | 9.502 | 1.57098 | 70.9 |
| 8 | −302.956 | 0.116 | | |
| 9 | 64.461 | 6.206 | 1.82016 | 46.4 |
| 10 | 130.958 | D10 | | |
| 11 | 54.496 | 0.771 | 1.83932 | 36.9 |
| 12 | 14.181 | 6.852 | | |
| 13 | −61.901 | 0.771 | 1.83945 | 42.5 |
| 14 | 40.862 | 1.368 | | |
| 15 | 25.631 | 4.732 | 1.85501 | 23.7 |

TABLE 1-continued

| # | R | D | $N_e$ | $v_e$ |
|---|---|---|---|---|
| 16 | −49.180 | 0.665 | | |
| 17 | −32.185 | 0.771 | 1.77620 | 49.3 |
| 18 | 79.600 | D18 | | |
| 19 | −27.304 | 0.771 | 1.75843 | 52.1 |
| 20 | 41.637 | 2.390 | 1.85501 | 23.7 |
| 21 | ∞ | D21 | | |
| 22 | ∞ (stop) | 1.706 | | |
| 23 | 213.835 | 4.828 | 1.52033 | 58.7 |
| 24 | −34.837 | 0.116 | | |
| 25 | 153.522 | 3.267 | 1.59143 | 61.0 |
| 26 | −2088.371 | 0.116 | | |
| 27 | 51.765 | 7.016 | 1.52033 | 58.7 |
| 28 | −36.176 | 1.205 | 1.80810 | 46.3 |
| 29 | −518.539 | 32.938 | | |
| 30 | 49.070 | 4.655 | 1.51825 | 63.9 |
| 31 | −82.602 | 0.116 | | |
| 32 | 34.236 | 6.180 | 1.48914 | 70.2 |
| 33 | −41.312 | 1.253 | 1.83945 | 42.5 |
| 34 | 21.220 | 3.442 | | |
| 35 | 31.261 | 8.163 | 1.51825 | 63.9 |
| 36 | −22.118 | 1.205 | 1.83945 | 42.5 |
| 37 | −94.916 | 0.116 | | |
| 38 | 84.626 | 6.426 | 1.48914 | 70.2 |
| 39 | −26.108 | 10.665 | | |
| 40 | ∞ | 33.000 | 1.58565 | 46.2 |
| 41 | ∞ | 13.200 | 1.51825 | 63.9 |
| 42 | ∞ (image) | | | |

Table 2 below shows at both the wide-angle end (WIDE) and telephoto end (TELE) for Prior Art Example 1: the focal length f (in mm); the F-number $F_{NO}$ with the diaphragm stop fully open; and the on-axis spacings D10, D18 and D21 (in mm) between the lens groups. Also listed, for the wide-angle end (WIDE) of Prior Art Example 1 are: the back focus Bf (in mm) of the zoom lens; the back focus $Bf_{4b}$ of the rear subgroup of the fourth lens group that is moveable in order to adjust the back focus; the ratio $Bf_{4b}/Bf$; the maximum ray height Ha on the image-side surface immediately before the movable component(s) of the fourth lens group (in this case, the surface of radius of curvature $R_{29}$) at the wide-angle end when the diaphragm stop is fully open; the maximum ray height Hb on the lens surface of the movable component(s) of the fourth lens group nearest the object side (in this case, the surface of radius of curvature $R_{30}$) at the wide-angle end when the diaphragm stop is fully open; the absolute value of Ha minus Hb; the value 0.02 $Bf/F_N$; and the amount of axial shift (in mm) in focal point position when the rear subgroup IVb is moved (from the position given in Table 1) 1 mm toward the image so as to adjust the back focus. In the bottom portion of the table are listed the image sensor diameter (hereinafter termed the "screen size", in mm) for which the zoom lens of Prior Art Example 1 is designed, as well as the diameter of the diaphragm stop (in mm) when fully open.

TABLE 2

| | WIDE | TELE |
|---|---|---|
| f | 8 | 160 |
| $F_{NO}$ | 1.65 | 2.56 |
| D10 | 0.944 | 54.595 |
| D18 | 55.218 | 7.177 |
| D21 | 6.514 | 0.905 |
| Bf | 40.171 | |
| $Bf_{4b}$ | 40.036 | |
| $Bf_{4b}/Bf$ | 0.997 | |
| Ha | 15.649 | |
| Hb | 15.409 | |

TABLE 2-continued

|  | WIDE | TELE |
|---|---|---|
| Ha − Hb | 0.24 |  |
| 0.02 Bf/$F_N$ | 0.487 |  |
| Focal point shift | 1 |  |

Screen size: Φ = 11.0
Diaphragm stop diameter when fully open = 27.858

FIGS. 19(*a*) and 19(*b*) show the spherical aberration and the astigmatism, respectively, at the wide-angle end of the zoom lens of Prior Art Example 1 with the image plane position as designed (i.e., as given in Table 1 above). FIGS. 19(*c*) and 19(*d*) show the spherical aberration and astigmatism, respectively, at the wide-angle end of the zoom lens of Prior Art Example 1 after the rear subgroup IVb has been moved (from the position indicated in Table 1 above) 1 mm toward the image so as to adjust the back focus. In FIGS. 19(*b*) and 19(*d*) the astigmatism is shown for both the sagittal (S) and tangential (T) image planes. As is apparent from FIGS. 19(*a*)–19(*d*), the zoom lens of Prior Art Example 1 does not show significant differences in spherical aberration and astigmatism after the rear subgroup IVb has been moved (from its position indicated in Table 1) 1 mm toward the image so as to adjust the back focus. In fact, the lens performance changes very little when the rear subgroup IVb is moved 1 mm toward the image from its design position.

PRIOR ART EXAMPLE 2

Unlike the zoom lens of Prior Art Example 1 described above, a zoom lens used in a simple television camera such as a CCTV (hereinafter termed Prior Art Example 2) is formed of a simple and compact lens group that is moved for adjusting the back focus. Therefore, the lens performance will inevitably change in association with the back focus adjustment. The basic lens element configuration of the zoom lens of Prior Art Example 2 is shown in FIG. 18.

As is shown in FIG. 18, the zoom lens of Prior Art Example 2 is formed of, in order from the object side, a first lens group I having a first lens $L_1$ through a third lens $L_3$, a second lens group II having a fourth lens $L_4$ through a sixth lens $L_6$, a third lens group III having a seventh lens $L_7$, and a fourth lens group IV having an eighth lens $L_8$ through a fourteenth lens $L_{14}$. The fourth lens group IV further is organized as a front subgroup IVa formed of an eighth lens $L_8$ through an eleventh lens $L_{11}$, and a rear subgroup IVb formed of a twelfth lens $L_{12}$ through a fourteenth lens $L_{14}$.

A diaphragm stop 1 is positioned between $L_8$ and $L_9$. A filter 2 is positioned between the rear subgroup IVb and an image sensor 3 such as a CCD. The image sensor 3 and filter 2 are provided in the television camera body. X is the optical axis in FIG. 18.

Table 3 below shows the surface # in order from the object side, the radius of curvature R (in mm) of each surface, the on-axis spacing D (in mm) between surfaces, as well as the refractive index $N_e$ and Abbe number $\nu_e$ (both at the e-line) of the lens elements of the zoom lens of Prior Art Example 2.

TABLE 3

| # | R | D | $N_e$ | $\nu_e$ |
|---|---|---|---|---|
| 1 | 101.143 | 1.739 | 1.79191 | 25.5 |
| 2 | 47.046 | 8.790 | 1.59143 | 61.0 |
| 3 | −127.845 | 0.098 |  |  |
| 4 | 36.375 | 4.883 | 1.59143 | 61.0 |
| 5 | 74.271 | D5 |  |  |
| 6 | 100.166 | 0.801 | 1.72341 | 50.1 |
| 7 | 17.576 | 4.835 |  |  |
| 8 | −21.703 | 0.801 | 1.72341 | 50.1 |
| 9 | 19.417 | 3.780 | 1.81262 | 25.3 |
| 10 | −237.680 | D10 |  |  |
| 11 | −33.107 | 0.801 | 1.72794 | 37.7 |
| 12 | −334.076 | D12 |  |  |
| 13 | 112.912 | 5.411 | 1.70558 | 40.9 |
| 14 | −30.760 | 1.807 |  |  |
| 15 | ∞ (stop) | 1.660 |  |  |
| 16 | 50.604 | 4.542 | 1.62508 | 52.8 |
| 17 | −75.801 | 2.149 |  |  |
| 18 | −27.512 | 1.465 | 1.81262 | 25.3 |
| 19 | −152.164 | 0.098 |  |  |
| 20 | 24.115 | 5.762 | 1.64128 | 55.2 |
| 21 | −320.217 | 12.736 |  |  |
| 22 | −62.407 | 1.270 | 1.81262 | 25.3 |
| 23 | 17.953 | 1.465 |  |  |
| 24 | 46.397 | 3.907 | 1.64128 | 55.2 |
| 25 | −25.769 | 0.098 |  |  |
| 26 | 16.223 | 3.125 | 1.62409 | 36.1 |
| 27 | 72.764 | 12.320 |  |  |
| 28 | ∞ | 5.000 | 1.51824 | 63.9 |
| 29 | ∞ (image) |  |  |  |

Table 4 below shows at both the wide-angle end (WIDE) and telephoto end (TELE) for Prior Art Example 2: the focal length f (in mm); the F-number $F_{NO}$ with the diaphragm stop fully open; and the on-axis spacings D5, D10 and D12 (in mm) between the lens groups. Also listed, for the wide-angle end (WIDE) of Prior Art Example 2 are: the back focus Bf (in mm) of the zoom lens; the back focus $Bf_{4b}$ of the rear subgroup of the fourth lens group; the ratio $Bf_{4b}/Bf$; the maximum ray height Ha on the image-side surface immediately before the movable component(s) of the fourth lens group (in this case, the surface of radius of curvature $R_{21}$) at the wide-angle end when the diaphragm stop is fully open; the maximum ray height Hb on the lens surface of the movable component(s) of the fourth lens group nearest the object side (in this case, the surface of radius of curvature $R_{22}$) at the wide-angle end when the diaphragm stop is fully open; the absolute value of Ha minus Hb; the value 0.02 Bf/$F_N$; and the amount of axial shift (in mm) in focal point position when the rear subgroup IVb is moved (from the position given in Table 3) 1 mm toward the image so as to adjust the back focus. In the bottom portion of the table are listed the screen size (in mm) for which the zoom lens of Prior Art Example 2 is designed, as well as the diameter of the diaphragm stop (in mm) when fully open.

TABLE 4

|  | WIDE | TELE |
|---|---|---|
| f | 12.5 | 75 |
| $F_{NO}$ | 1.65 | 1.66 |
| D5 | 1.221 | 30.571 |
| D10 | 28.675 | 3.127 |
| D12 | 4.288 | 0.485 |
| Bf | 15.613 |  |
| $Bf_{4b}$ | 50.163 |  |
| $Bf_{4b}$/Bf | 3.213 |  |
| Ha | 8.999 |  |
| Hb | 5.744 |  |

TABLE 4-continued

|  | WIDE | TELE |
|---|---|---|
| Ha − Hb | 3.255 |  |
| 0.02 Bf/$F_N$ | 0.189 |  |
| Focal point shift | 0.375 |  |

Screen size: Φ = 11.0
Diaphragm stop diameter when fully open = 19.613

FIGS. 20(a) and 20(b) show the spherical aberration and the astigmatism, respectively, at the wide-angle end of the zoom lens of Prior Art Example 2 when the rear subgroup IVb is positioned at its design position. FIGS. 20(c) and 20(d) show the spherical aberration and astigmatism, respectively, at the wide-angle end of the zoom lens of Prior Art Example 2 after the rear subgroup IVb has been moved (from the position given in Table 3 above) 1 mm toward the image so as to adjust the back focus. The curves shown in each of FIGS. 20(b) and 20(d) are for the astigmatism in the sagittal (S) and tangential (T) image planes. As is apparent from FIGS. 20(a)–20(d), the zoom lens of Prior Art Example 2 undergoes significant deterioration in spherical aberration and some deterioration in astigmatism as a result of the subgroup IVb being moved 1 mm toward the image so as to adjust the back focus.

BRIEF SUMMARY OF THE INVENTION

The present invention relates to a zoom lens for television cameras, especially to a zoom lens that can be mounted in a camera body such as a CCTV (Closed Circuit television) camera and that has an adjustable back focus.

The object of the present invention is to provide a zoom lens in which a lens component that is moved for adjusting the back focus has a simple and compact structure and the lens performance is maintained even when the back focus is adjusted, as is often necessary where the zoom lens, in use, may be mounted to various T.V. cameras of broadcast quality with the same nominal design, but the mounting flanges from camera to camera vary somewhat due to production tolerances.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
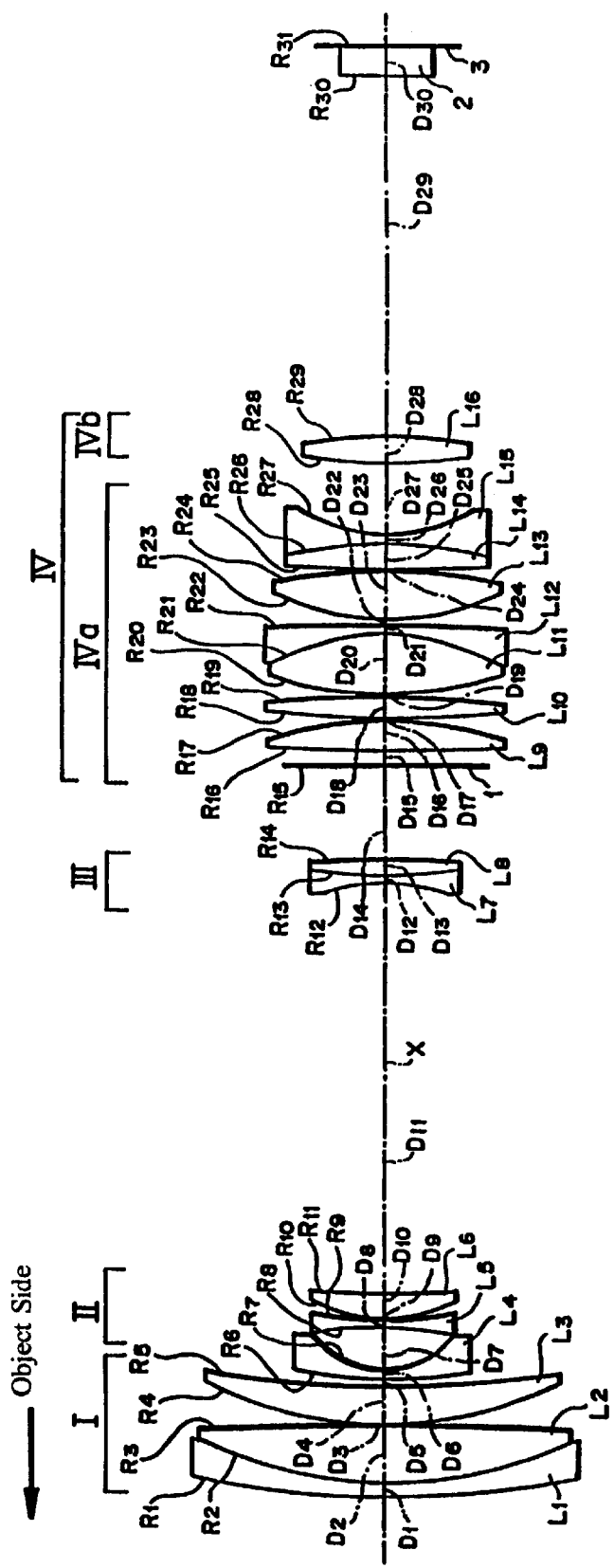
FIG. 1 shows the basic lens element configuration of Embodiment 1 of the present invention.

The zoom lens of the present invention is formed of, in order from the object side, a first lens group having positive refractive power, a second lens group having negative refractive power and that moves for changing the magnification when zooming, a third lens group having negative refractive power and that moves for correcting image plane shifts that otherwise would accompany magnification change during zooming, and a fourth lens group having positive refractive power. The fourth lens group is formed of a front subgroup and a rear subgroup with the rear subgroup consisting of a single positive lens element that moves so as to adjust the back focus (i.e., to position the image plane at a desired axial position, which varies due to manufacturing tolerances even among broadcast quality T.V. cameras that are built to a common specification).

It is preferred that the following Condition (1) is satisfied:

$$1.0 < Bf_{4b}/Bf < 1.5 \qquad \text{Condition (1)}$$

where

Bf is the back focus of the zoom lens, and $Bf_{4b}$ is the back focus of the rear subgroup of the fourth lens group.

Condition (1) limits the ratio $Bf_{4b}/Bf$ to a specified range. This reduces the deviation in aberrations when the rear subgroup IVb of the fourth lens group is moved for adjusting the back focus. When the ratio $Bf_{4b}/Bf$ exceeds the lower limit in Condition (1), the aberrations are not satisfactorily corrected. When the ratio $Bf_{4b}/Bf$ exceeds the upper limit, the rear subgroup IVb has an excessive power, increasing the deviation in aberrations as the rear subgroup IVb is moved.

It is also preferred that the following Condition (2) is satisfied:

$$|Ha - Hb| < 0.02 \times Bf/Fn \qquad \text{Condition (2)}$$

where

Bf is as defined above,

Fn is the F-number at the wide-angle end with the diaphragm stop fully open,

Ha is the maximum ray height on the image-side surface immediately before the movable component(s) of the fourth lens group, at the wide-angle end when the diaphragm stop is fully open; and Hb is the maximum ray height on the lens surface of the movable component(s) of the fourth lens group nearest the object side, at the wide-angle end when the diaphragm stop is fully open.

Condition (2) limits the height difference to a specified range of the outermost rays on the image-side surface of $L_{15}$ versus the object-side surface of $L_{16}$ This reduces deviations in spherical aberration when the rear subgroup IVb of the fourth lens group is moved for adjusting the back focus. When the absolute value of Ha−Hb exceeds a predetermined value, the deviation in spherical aberration significantly increases as the rear subgroup is moved, causing the lens performance to degrade.

It is further preferred that the front subgroup of the fourth lens group is formed of, in order from the object side, a positive lens with a convex surface on the image side, a biconvex lens, a doublet having a positive lens element joined to a negative lens element, a positive lens with a convex surface on the object side, and a doublet having a positive lens element joined to a negative lens element.

It is further preferred that, the first lens group is formed of, in order from the object side, a doublet having a negative lens element joined to a positive lens element, and a positive meniscus lens with its convex surface on the object side. And, it is preferred that the second lens group is formed of, in order from the object side, a negative lens element, a negative lens element, and a positive meniscus lens element with its convex surface on the object side. Further it is preferred that the third lens group is formed of a doublet having a biconcave lens element joined to a positive lens element.

Three embodiments of the zoom lens of the present invention will now be described in detail.

Embodiment 1

FIG. 1 shows the basic lens element configuration of the zoom lens of Embodiment 1 of the present invention. The zoom lens of Embodiment 1 is formed of, in order from the object side, a first lens group I having positive refractive power, a second lens group II having negative refractive power and that moves for changing magnification when zooming, a third lens group III having negative refractive power and that moves for correcting image plane shifts that otherwise would accompany magnification change during zooming, and a fourth lens group IV having positive refractive power. The fourth lens group IV is formed of a front subgroup IVa and a rear subgroup IVb.

The first lens group I is formed of, in order from the object side, a doublet having a negative meniscus lens element $L_1$ with its convex surface on the object side that is joined to a biconvex lens element $L_2$, and a positive meniscus lens element $L_3$ with its convex surface on the object side.

The second lens group II is formed of, in order from the object side, a negative meniscus lens element $L_4$ with its convex surface on the object side, a biconcave lens element $L_5$, and a positive meniscus lens element $L_6$ with its convex surface on the object side.

The third lens group III is formed of a doublet having, in order from the object side, a biconcave lens element $L_7$ joined to a biconvex lens element $L_8$.

The fourth lens group IV is formed of a front subgroup IVa and a rear subgroup IVb. The front subgroup IVa is formed of, in order from the object side, a biconvex lens element $L_9$ with different radii of curvature on its two sides, a biconvex lens element $L_{10}$, a doublet having a biconvex lens element $L_{11}$ that is joined to a negative meniscus lens element $L_{12}$ with its convex surface on the image side, a biconvex lens element $L_{13}$ having different radii of curvature on its two sides, and a doublet formed of a biconvex lens element $L_{14}$ that is joined to a biconcave lens element $L_{15}$. The rear subgroup IVb consists of a single biconvex lens element $L_{16}$.

The biconvex lens element $L_9$ is positioned with its surface of smaller radius of curvature on the image side, and the biconvex lens element $L_{13}$ is positioned with its surface of smaller radius of curvature on the object side. A diaphragm stop 1 is positioned within the front subgroup IVa. A filter 2 is positioned between the rear subgroup IVb and an image sensor 3, such as a CCD. The image sensor 3 and the filter 2 are provided in a television camera body. The optical axis in FIG. 1 is indicated by an X. In the zoom lens of Embodiment 1, the rear subgroup IVb is moved along the optical axis X in order to adjust the back focus so that the image pick-up plane (image sensor 3) of the television camera coincides with the image plane of the zoom lens. The zoom lens of Embodiment 1 satisfies both Condition (1) and Condition (2) above.

Table 5 below lists the surface number # in order from the object side, the radius of curvature R (in mm) of each surface, the on-axis spacing D (in mm) between surfaces, as well as the index of refraction $N_e$ and the Abbe number $\nu_e$ (both at the e-line) of the lens elements of the zoom lens of Embodiment 1.

TABLE 5

| # | R | D | $N_e$ | $v_e$ |
|---|---|---|---|---|
| 1 | 164.503 | 2.441 | 1.81264 | 25.2 |
| 2 | 75.787 | 10.038 | 1.62286 | 60.1 |
| 3 | −975.027 | 0.117 | | |
| 4 | 73.436 | 6.396 | 1.71615 | 53.7 |
| 5 | 194.680 | D5 | | |
| 6 | 94.382 | 1.367 | 1.77620 | 49.3 |
| 7 | 16.011 | 7.417 | | |
| 8 | −69.864 | 1.172 | 1.77620 | 49.3 |
| 9 | 69.864 | 0.049 | | |
| 10 | 29.084 | 3.799 | 1.81264 | 25.2 |
| 11 | 108.952 | D11 | | |
| 12 | −35.768 | 1.172 | 1.80811 | 46.3 |
| 13 | 64.907 | 2.676 | 1.81264 | 25.2 |
| 14 | −346.174 | D14 | | |
| 15 | ∞ (stop) | 2.607 | | |
| 16 | 336.976 | 5.400 | 1.62286 | 60.1 |
| 17 | −65.101 | 0.117 | | |
| 18 | 143.651 | 4.560 | 1.62286 | 60.1 |
| 19 | −143.651 | 0.117 | | |
| 20 | 61.422 | 11.093 | 1.48914 | 70.2 |
| 21 | −37.634 | 1.562 | 1.81077 | 40.7 |
| 22 | −502.377 | 1.094 | | |
| 23 | 45.077 | 8.779 | 1.62286 | 60.1 |
| 24 | −87.381 | 0.137 | | |
| 25 | 464.633 | 4.404 | 1.48914 | 70.2 |
| 26 | −75.953 | 1.367 | 1.81077 | 40.7 |
| 27 | 29.349 | 12.337 | | |
| 28 | 90.467 | 4.424 | 1.62286 | 60.1 |
| 29 | −90.467 | 62.212 | | |
| 30 | ∞ | 5.000 | 1.51824 | 63.9 |
| 31 | ∞ (image) | | | |

Table 6 below lists, at both the wide-angle end (WIDE) and telephoto end (TELE), for Embodiment 1 of the present invention: the focal length f (in mm); the F-number $F_{NO}$ with the diaphragm stop fully open; and the on-axis spacings D5, D11 and D14 (in mm) between the lens groups. Also listed, for the wide-angle end of Embodiment 1 are: the back focus Bf (in mm) of the zoom lens; the back focus $Bf_{4b}$ of the rear subgroup of the fourth lens group; the ratio $Bf_{4b}/Bf$; the maximum ray height Ha on the image-side surface immediately before the movable component(s) of the fourth lens group (in this case, the surface of radius of curvature $R_{27}$) at the wide-angle end when the diaphragm stop is fully open; the maximum ray height Hb on the lens surface of the movable component(s) of the fourth lens group nearest the object side (in this case, the surface of radius of curvature $R_{28}$) at the wide-angle end when the diaphragm stop is fully open; the absolute value of Ha minus Hb; the value 0.02 $Bf/F_N$; and the amount of shift (in mm) in focal point position when the rear subgroup IVb is moved (from the position given in Table 5) 1 mm toward the image in order to adjust the back focus. In the bottom portion of the table are listed the screen size (in mm) for which the zoom lens of Embodiment 1 is designed, as well as the diameter of the diaphragm stop (in mm) when fully open.

TABLE 6

| | WIDE | TELE |
|---|---|---|
| f | 16.5 | 330 |
| $F_{NO}$ | 2.4 | 5.18 |
| D5 | 0.976 | 75.701 |
| D11 | 72.15 | 10.509 |
| D14 | 17.195 | 4.112 |
| Bf | 65.505 | |
| $Bf_{4b}$ | 71.934 | |
| $Bf_{4b}/Bf$ | 1.098 | |
| Ha | 14.377 | |
| Hb | 14.304 | |

TABLE 6-continued

| | WIDE | TELE |
|---|---|---|
| Ha − Hb | 0.073 | |
| 0.02 Bf/Fn | 0.546 | |
| Focal point shift | 0.992 | |

Screen size: Φ = 16.0
Diaphragm stop diameter when fully open = 36.561

As is apparent from Table 6, the zoom lens of Embodiment 1 satisfies Conditions (1) and (2).

Figure 4A:
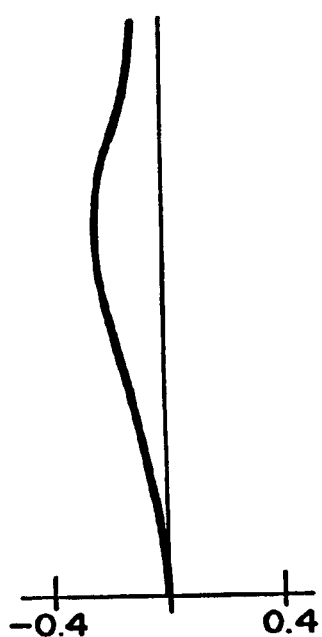
FIGS. 4(a) and 4(b) show the spherical aberration and astigmatism, respectively, of the zoom lens of Embodiment 1 at the wide-angle end.
Figure 4B:
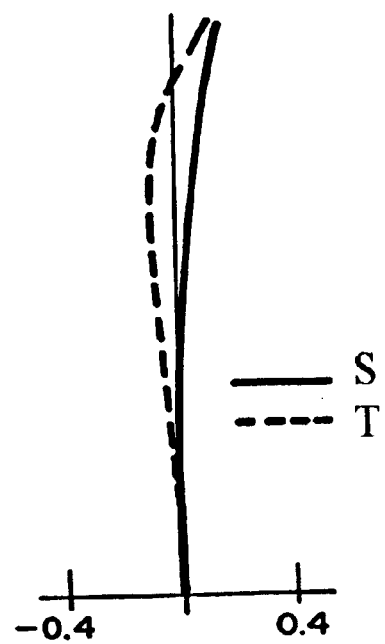
Figure 5:
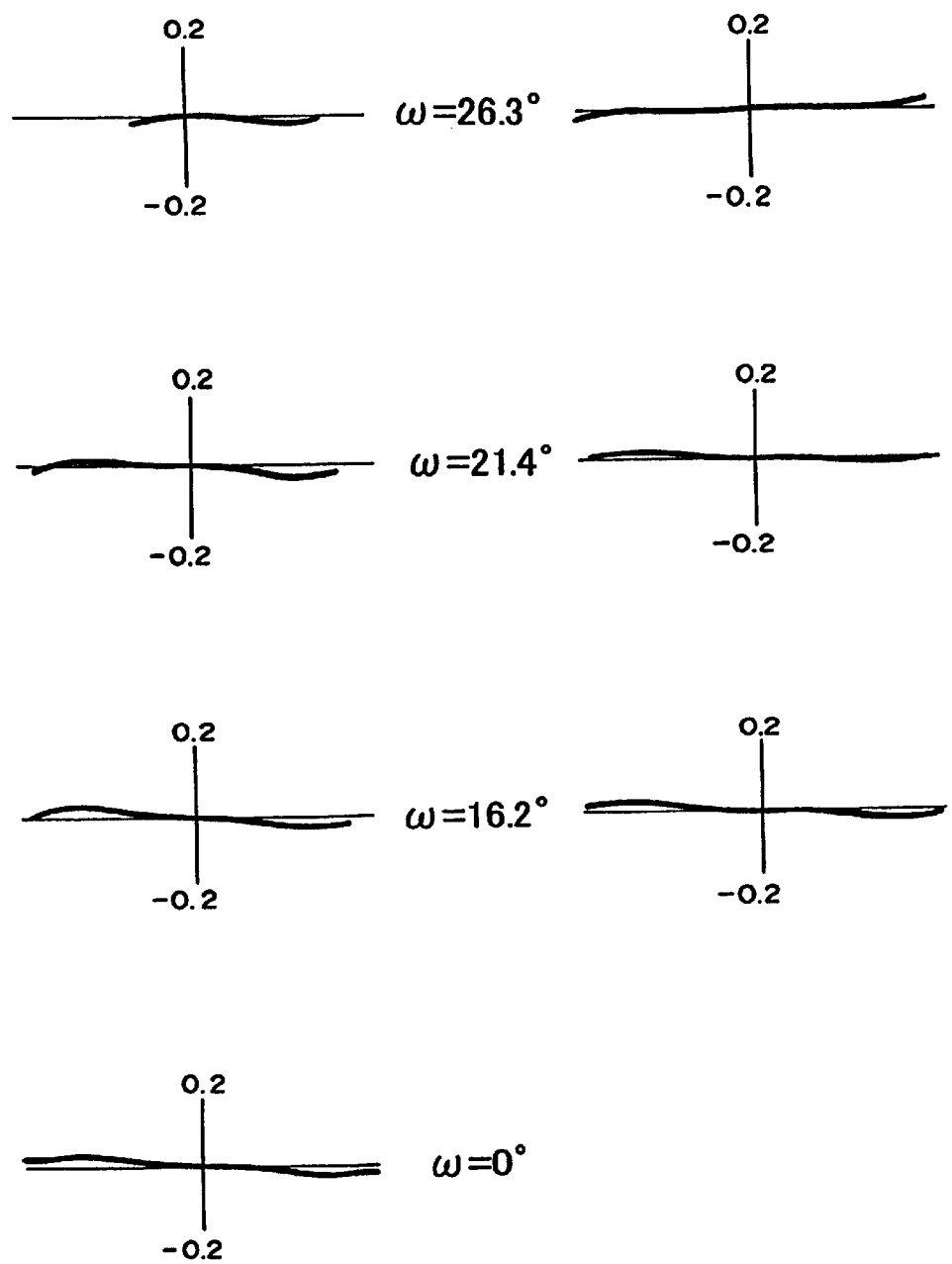
FIG. 5 shows the coma of the zoom lens of Embodiment 1 at the wide-angle end for field angles ω equal to 0, 16.2, 21.4 and 26.3 degrees for both the tangential (left column) and sagittal (right column) image surfaces.
Figure 6A:
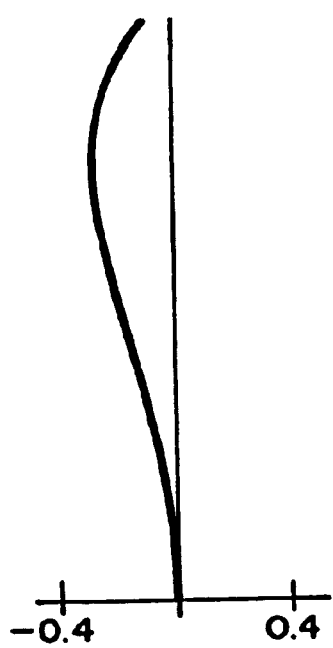
FIGS. 6(a)–6(b) show the spherical aberration and astigmatism, respectively, of the zoom lens of Embodiment 1 at the telephoto end.
Figure 6B:
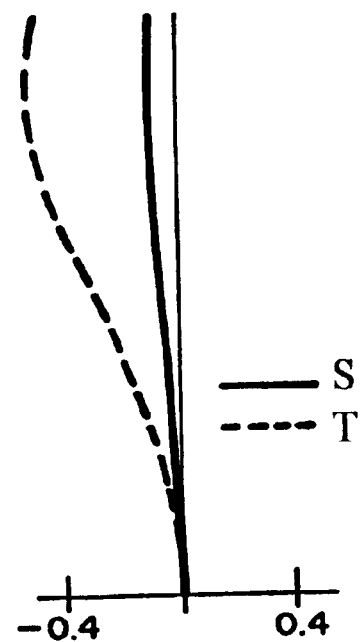
Figure 7:
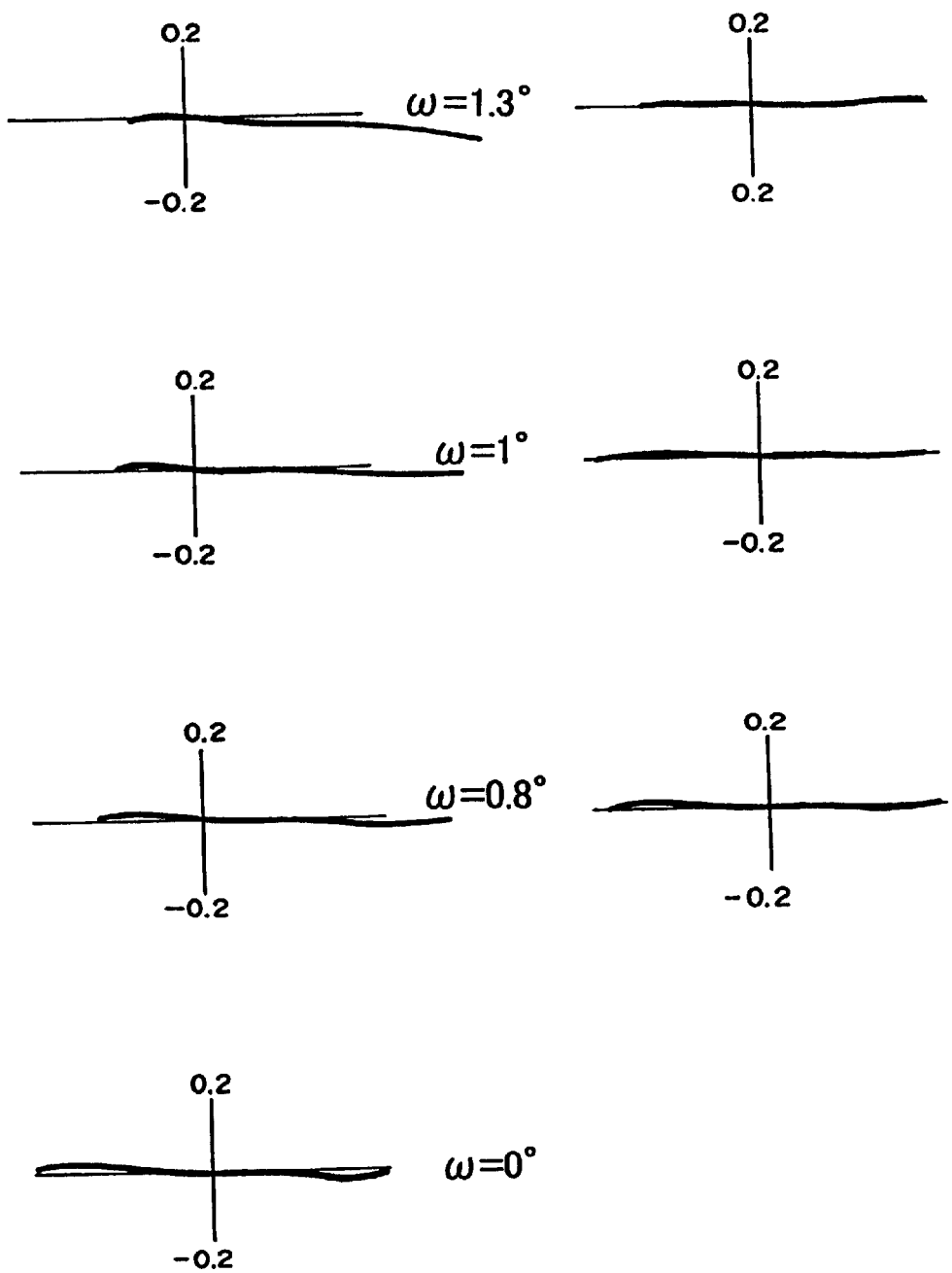
FIG. 7 shows the coma of the zoom lens of Embodiment 1 at the telephoto end for field angles ω equal to 0, 0.8, 1.0 and 1.3 degrees for both the tangential (left column) and sagittal (right column) image surfaces.

FIGS. 4(a) to 7 show aberrations of the zoom lens of Embodiment 1 with the distance to an object being 12 m. FIGS. 4(a) and 4(b) show the spherical aberration and astigmatism, respectively, at the wide-angle end. FIG. 5 shows the coma at the wide-angle end at field angles ω of 0, 16.2, 21.4 and 26.3 degrees, for both the tangential image plane (left column) and the sagittal image plane (right column), with the vertical axis dimension being in mm. As the coma on axis (ω=0°) is the same for both the tangential and sagittal image planes, only the curve for the tangential image plane is illustrated in the bottom row. FIGS. 6(a) and 6(b) show the spherical aberration and astigmatism, respectively, at the telephoto end. In FIGS. 4(b) and 6(b), the astigmatism is shown for both the sagittal (S) and tangential (T) image planes. FIG. 7 shows the coma at the telephoto end at field angles of 0, 0.8, 1.0 and 1.3 degrees, for both the tangential image plane (left column) and the sagittal image plane (right column), with the vertical axis dimension being in mm. Once, again only a single curve is illustrated in the bottom row, for the reason discussed above.

As is apparent from FIGS. 4(a) to 7, the zoom lens of Embodiment 1, has its aberrations favorably corrected just as satisfactorily as the zoom lens of Prior Art Example 1. Moreover, whereas the zoom lens of Prior Art Example 1 has a complex configuration of lens elements that are moved in order to adjust the back focus of the zoom lens, Embodiment 1 of the present invention provides a simpler and more compact configuration of the lens element(s) that are moved for adjusting the back focus.

Embodiment 2

Figure 2:
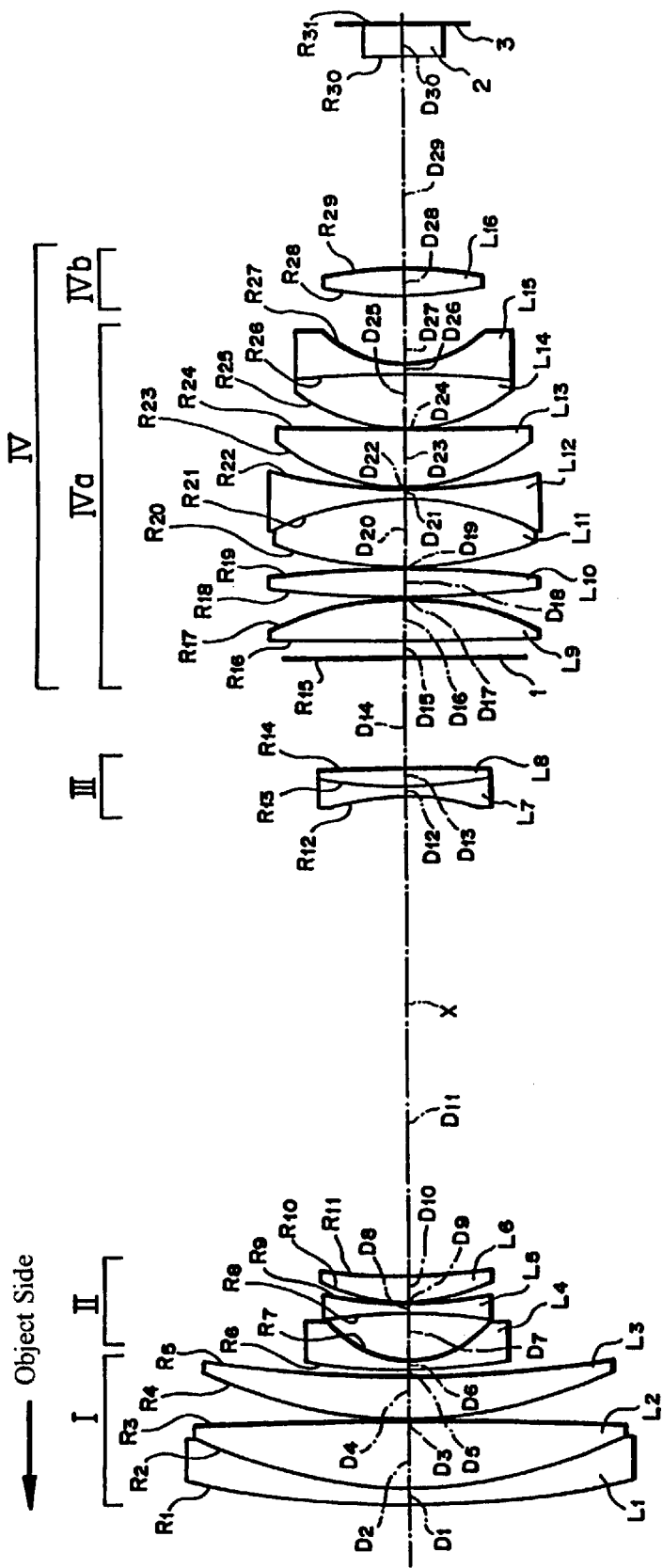
FIG. 2 shows the basic lens element configuration of Embodiment 2 of the present invention.

As shown in FIG. 2, the zoom lens of Embodiment 2 has nearly the same configuration as the zoom lens of Embodiment 1, except in this embodiment, the twelfth lens element $L_{12}$ is biconcave and the thirteenth lens element $L_{13}$ is a positive meniscus lens having a convex surface on the object side.

Table 7 below lists the surface number # in order from the object side, the radius of curvature R (in mm) of each surface, the on-axis spacing D (in mm) between surfaces, as well as the index of refraction $N_e$ and the Abbe number $v_e$ (both at the e-line) of the lens elements of the zoom lens of Embodiment 2.

TABLE 7

| # | R | D | $N_e$ | $v_e$ |
|---|---|---|---|---|
| 1 | 165.822 | 2.461 | 1.81264 | 25.2 |
| 2 | 76.395 | 10.119 | 1.62286 | 60.1 |
| 3 | −982.844 | 0.118 | | |
| 4 | 74.025 | 6.447 | 1.71615 | 53.7 |
| 5 | 196.241 | D5 | | |
| 6 | 95.139 | 1.378 | 1.77620 | 49.3 |
| 7 | 16.139 | 7.476 | | |
| 8 | −70.424 | 1.181 | 1.77620 | 49.3 |
| 9 | 70.424 | 0.049 | | |

TABLE 7-continued

| # | R | D | $N_e$ | $v_e$ |
|---|---|---|---|---|
| 10 | 29.317 | 3.829 | 1.81264 | 25.2 |
| 11 | 109.826 | D11 | | |
| 12 | −36.055 | 1.181 | 1.80810 | 46.3 |
| 13 | 65.427 | 2.697 | 1.81264 | 25.2 |
| 14 | −348.950 | D14 | | |
| 15 | ∞ (stop) | 2.628 | | |
| 16 | 691.470 | 6.506 | 1.62286 | 60.1 |
| 17 | −47.321 | 0.118 | | |
| 18 | 171.620 | 4.262 | 1.62286 | 60.1 |
| 19 | −171.620 | 0.118 | | |
| 20 | 54.090 | 10.660 | 1.48914 | 70.2 |
| 21 | −41.450 | 1.575 | 1.81077 | 40.7 |
| 22 | 88.043 | 0.118 | | |
| 23 | 29.741 | 8.997 | 1.62286 | 60.1 |
| 24 | 1148.88 | 0.138 | | |
| 25 | 27.519 | 8.347 | 1.48914 | 70.2 |
| 26 | −132.735 | 1.378 | 1.81077 | 40.7 |
| 27 | 18.577 | 10.241 | | |
| 28 | 58.787 | 4.380 | 1.62286 | 60.1 |
| 29 | −58.787 | 32.131 | | |
| 30 | ∞ | 5.000 | 1.51824 | 63.9 |
| 31 | ∞ (image) | | | |

Table 8 below lists at both the wide-angle end (WIDE) and telephoto end (TELE) for Embodiment 2 of the present invention: the focal length f (in mm); the F-number $F_{NO}$ with the diaphragm stop fully open; and the on-axis spacings D5, D11 and D14 (in mm) between the lens groups. Also, for the wide-angle end of Embodiment 2 are listed: the back focus Bf (in mm) of the zoom lens; the back focus $Bf_{4b}$ of the rear subgroup of the fourth lens group; the ratio $Bf_{4b}/Bf$; the maximum ray height Ha on the image-side surface immediately before the movable component(s) of the fourth lens group (in this case, the surface of radius of curvature $R_{27}$) at the wide-angle end when the diaphragm stop is fully open; the maximum ray height Hb on the lens surface of the movable component(s) of the fourth lens group nearest the object side (in this case, the surface of radius of curvature $R_{28}$) at the wide-angle end when the diaphragm stop is fully open; the absolute value of Ha minus Hb; the value 0.02 $Bf/F_N$; and the amount of shift (in mm) in focal point position when the rear subgroup IVb is moved (from the position given in Table 7 above) 1 mm toward the image in order to adjust the back focus. In the bottom portion of the table are listed the screen size (in mm) for which the zoom lens of Embodiment 2 is designed, as well as the diameter of the diaphragm stop (in mm) when fully open.

TABLE 8

| | WIDE | TELE |
|---|---|---|
| f | 11.5 | 230 |
| $F_{NO}$ | 1.65 | 3.58 |
| D5 | 0.984 | 76.308 |
| D11 | 72.729 | 10.593 |
| D14 | 17.333 | 4.145 |
| Bf | 35.423 | |
| $Bf_{4b}$ | 46.507 | |
| $Bf_{4b}/Bf$ | 1.313 | |
| Ha | 12.102 | |
| Hb | 11.794 | |
| Ha − Hb | 0.308 | |
| 0.02 Bf/Fn | 0.429 | |
| Focal point shift | 0.946 | |

Screen size: Φ = 11.0
Diaphragm stop diameter when fully open = 36.964

As is apparent from Table 8, the zoom lens of Embodiment 2 satisfies the above Conditions (1) and (2).

Figure 8A:
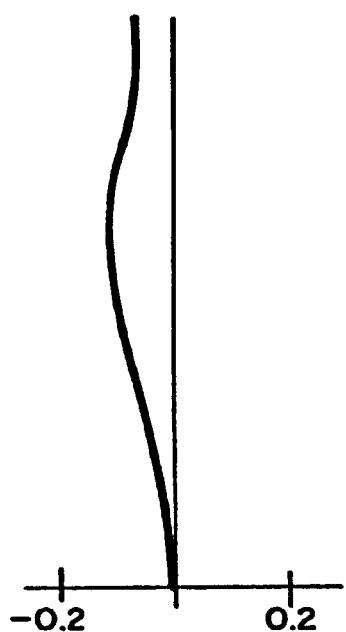
FIGS. 8(a) and 8(b) show the spherical aberration and astigmatism, respectively, of the zoom lens of Embodiment 2 at the wide-angle end.
Figure 8B:
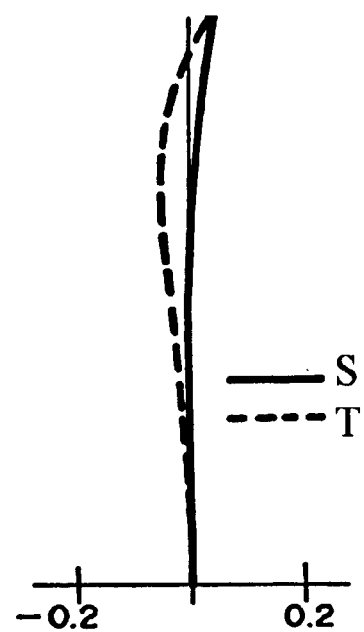
Figure 9:
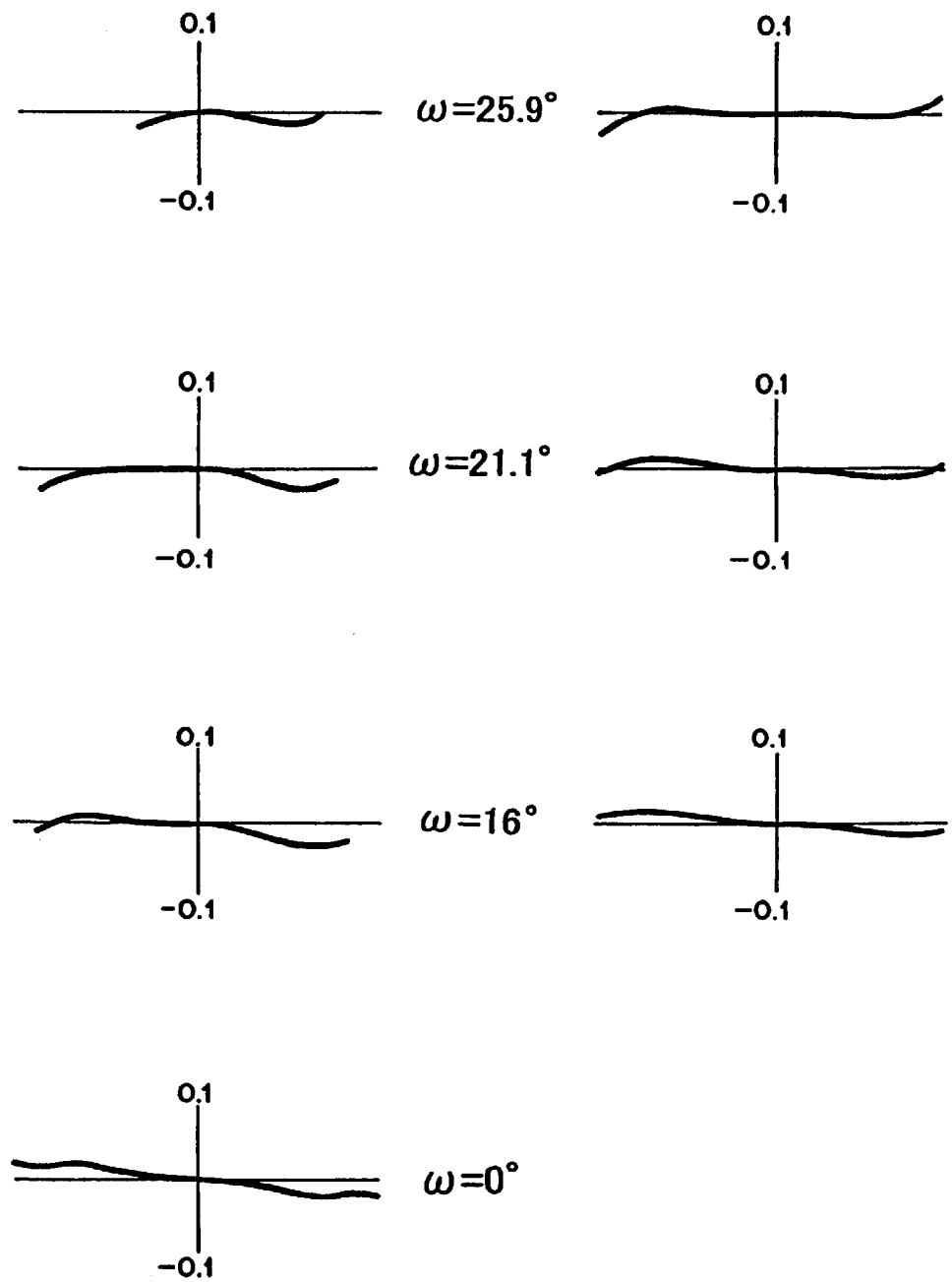
FIG. 9 shows the coma of the zoom lens of Embodiment 2 at the wide-angle end for field angles ω equal to 0, 16, 21.1, and 25.9 degrees for both the tangential (left column) and sagittal (right column) image surfaces.
Figure 10A:
FIGS. 10(a) and 10(b) show the spherical aberration and astigmatism, respectively, of the zoom lens of Embodiment 2 at the telephoto end.
Figure 10B:
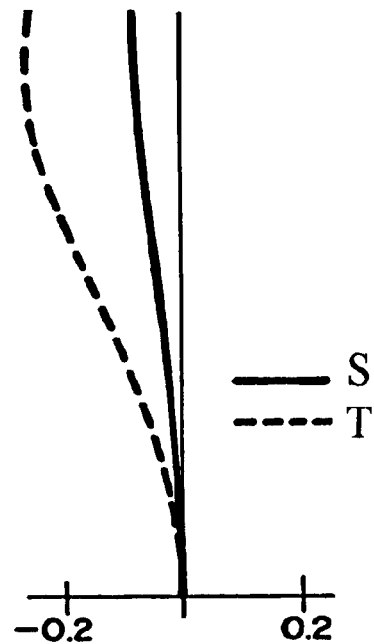
Figure 11:
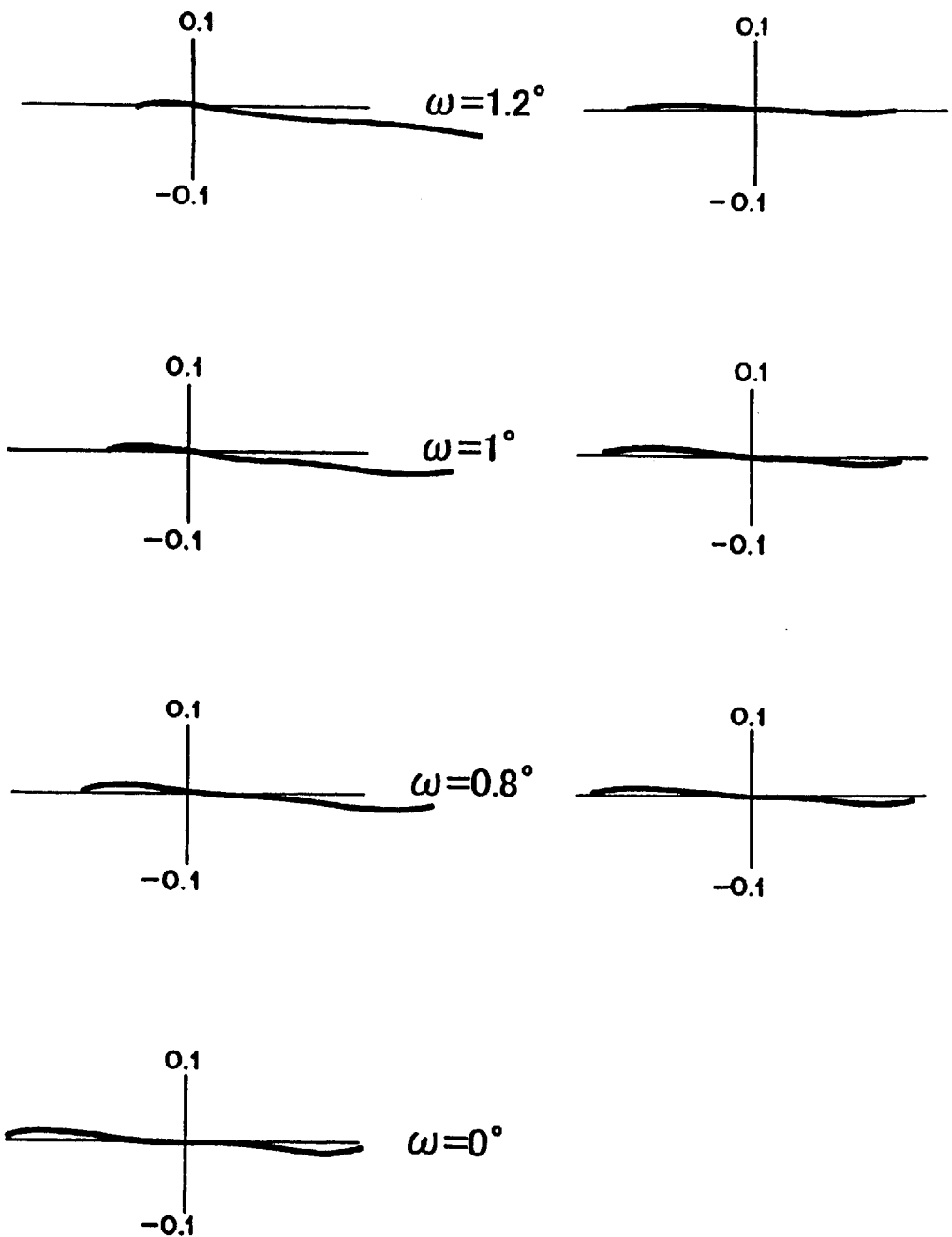
FIG. 11 shows the coma of the zoom lens of Embodiment 2 at the telephoto end for field angles ω equal to 0, 0.8, 1.0, and 1.2 degrees for both the tangential (left column) and sagittal (right column) image surfaces.

FIGS. 8(a) to 11 show aberrations of the zoom lens of Embodiment 2 with the distance to an object being 12 m. FIGS. 8(a) and 8(b) show the spherical aberration and astigmatism, respectively, at the wide-angle end. FIG. 9 shows the coma at the wide-angle end at field angles ω of 0, 16, 21.1 and 25.9 degrees, for both the tangential image plane (left column) and the sagittal image plane (right column), with the vertical axis dimension being in mm. As the coma on axis (ω=0°) is the same for both the tangential and sagittal image planes, only the curve for the tangential image plane is illustrated in the bottom row. FIGS. 10(a) and 10(b) show the spherical aberration and astigmatism, respectively, at the telephoto end. In FIGS. 8(b) and 10(b), the astigmatism is shown for both the sagittal (S) and tangential (T) image planes. FIG. 11 shows the coma at the telephoto end at field angles of 0, 0.8, 1.0 and 1.2 degrees, for both the tangential image plane (left column) and the sagittal image plane (right column), with the vertical axis dimension being in mm. Once, again only a single curve is illustrated in the bottom row, for the reason discussed above.

Figure 12A:
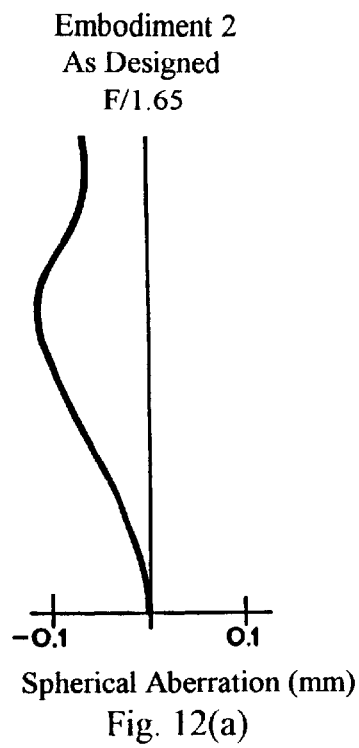
FIGS. 12(a) and 12(b) show the spherical aberration and astigmatism, respectively, at the wide-angle end of the zoom lens of Embodiment 2 as designed.
Figure 12B:
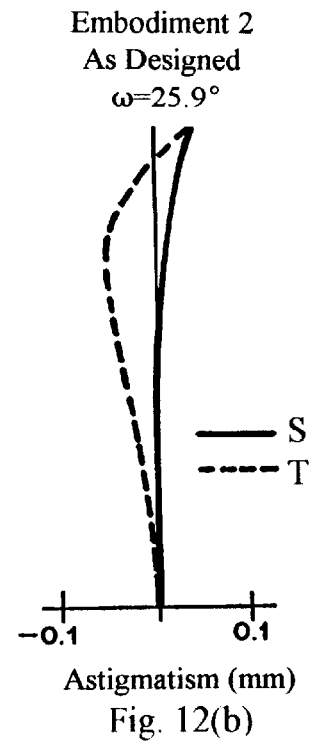
Figure 12C:
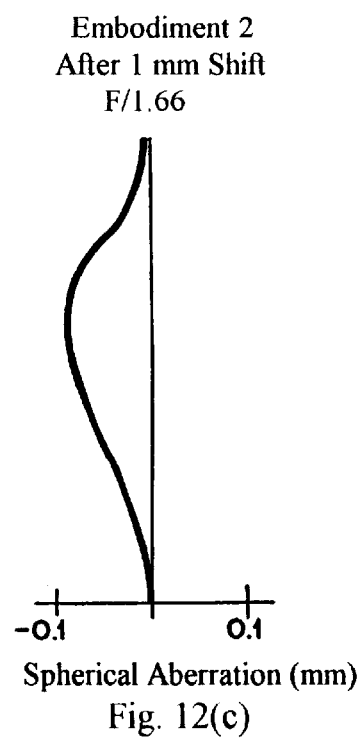
FIGS. 12(c) and 12(d) show these same respective aberrations after a rear subgroup of the fourth lens group has been moved 1 mm toward the image from its design position so as to adjust the back focus.
Figure 12D:
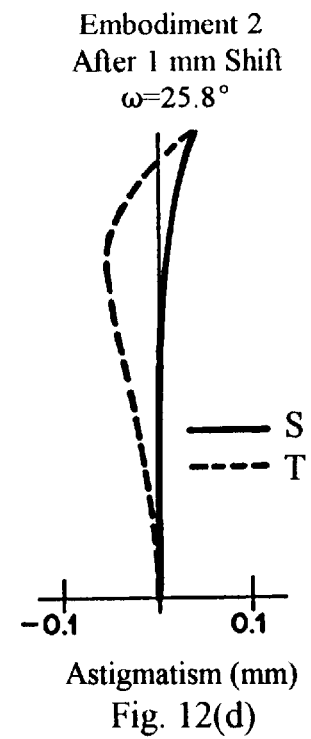

FIGS. 12(a)–12(d) show the spherical aberration and the astigmatism at the wide angle end of the zoom lens of Embodiment 2. FIGS. 12(a) and 12(b) show the spherical aberration and the astigmatism, respectively, with the image plane position as designed, and FIGS. 12(c) and 12(d) show these aberrations after the rear subgroup IVb of the fourth lens group has been moved (from the position given in Table 7 above) 1 mm toward the image so as to adjust the back focus. In FIGS. 12(b) and 12(d), the astigmatism is shown for both the sagittal (S) and tangential (T) image planes.

Figure 19A:
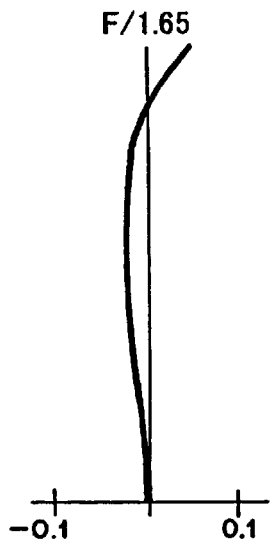
FIGS. 19(a) and 19(b) show the spherical aberration and astigmatism, respectively, at the wide-angle end of the zoom lens of Prior Art Example 1 at the design position.
Figure 19B:
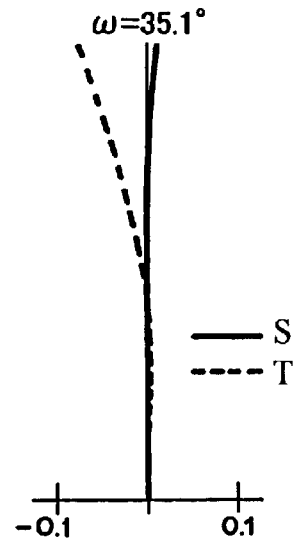
Figure 19C:
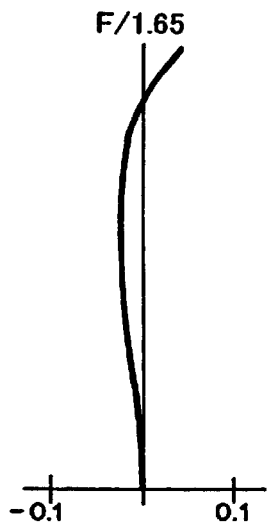
FIGS. 19(c) and 19(d) show the spherical aberration and astigmatism, respectively, after the rear subgroup IVb of the fourth lens group has been moved 1 mm toward the image so as to adjust the back focus.
Figure 19D:
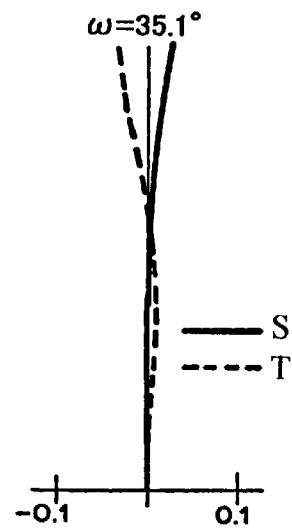
Figure 20A:
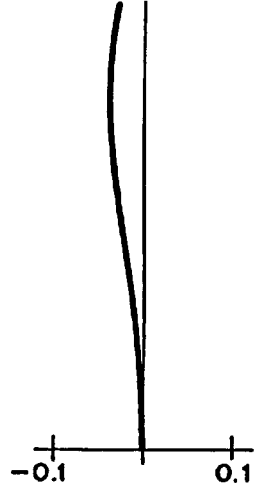
FIGS. 20(a) and 20(b) show the spherical aberration and astigmatism, respectively, at the wide-angle end of the zoom lens of Prior Art Example 2 at its design position.
Figure 20B:
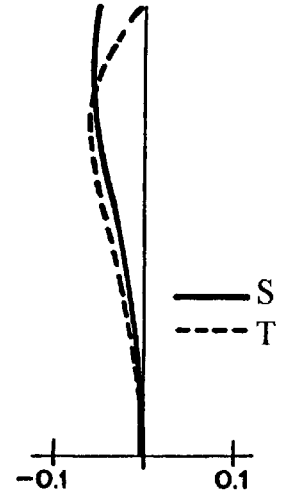
Figure 20C:
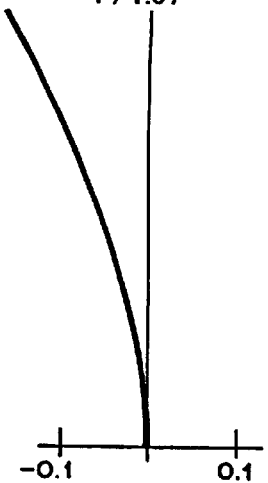
FIGS. 20(c) and 20(d) show the spherical aberration and astigmatism, respectively, after the rear subgroup IV(b) of the fourth lens group has been moved 1 mm toward the image so as to adjust the back focus.
Figure 20D:
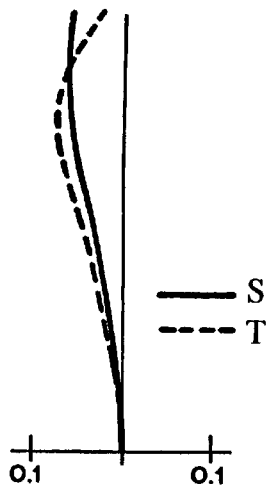

As is apparent from comparing FIGS. 8(a) to 12(d) with FIGS. 19(a)–(b), the zoom lens of Embodiment 2, has its aberrations corrected almost as satisfactorily as Prior Art Example 1. The astigmatism is somewhat improved, and the spherical aberration, though generally different, is not significantly degraded. Moreover, whereas Prior Art Example 1 has a complex configuration of lens elements that are moved in order to adjust the back focus of the zoom lens, the present invention provides a simpler and more compact configuration of the lens group that is moved for adjusting the back focus. As is apparent from FIG. 12, the zoom lens of Embodiment 2 does not show significant differences in spherical aberration and astigmatism after the rear subgroup IVb has been moved 1 mm toward the image in order to adjust the back focus. Indeed, the lens performance remains satisfactory as the back focus is adjusted despite the simpler and more compact configuration of the lens subgroup that is moved as compared to Prior Art Example 1 which has a more complex configuration of lens elements that are moved.

Embodiment 3

Figure 3:
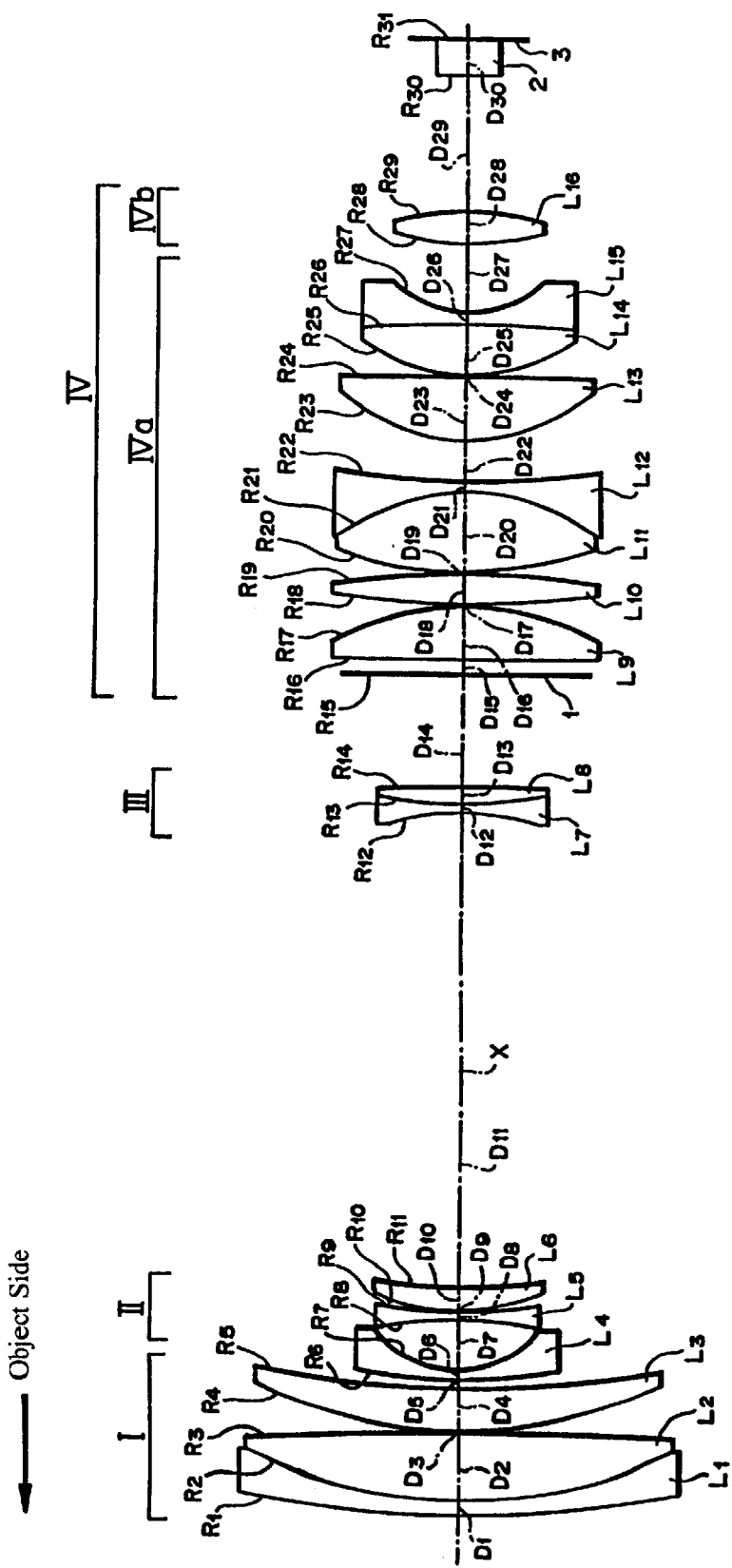
FIG. 3 shows the basic lens element configuration of Embodiment 3 of the present invention.

The zoom lens of Embodiment 3, as is shown in FIG. 3, has nearly the same configuration as the zoom lens of Embodiment 1 except, in this embodiment, the ninth lens element $L_9$ of the front subgroup IVa is a piano-convex lens with its convex surface on the image side, the twelfth lens element $L_{12}$ of the front subgroup IVa is a biconcave lens, and the thirteenth lens element $L_{13}$ of the front subgroup IVa is a piano-convex lens with its convex surface on the object side.

Table 9 below lists the surface number # in order from the object side, the radius of curvature R (in mm) of each surface, the on-axis spacing D (in mm) between surfaces, as well as the index of refraction $N_e$ and the Abbe number $v_e$ (both at the e-line) of the lens elements of the zoom lens of Embodiment 3.

TABLE 9

| # | R | D | $N_e$ | $v_e$ |
|---|---|---|---|---|
| 1 | 158.290 | 2.349 | 1.81264 | 25.2 |
| 2 | 72.924 | 9.659 | 1.62286 | 60.1 |
| 3 | −938.197 | 0.113 | | |
| 4 | 70.662 | 6.154 | 1.71615 | 53.7 |
| 5 | 187.327 | D5 | | |
| 6 | 90.817 | 1.315 | 1.77620 | 49.3 |
| 7 | 15.406 | 7.137 | | |
| 8 | −67.225 | 1.128 | 1.77620 | 49.3 |
| 9 | 67.225 | 0.047 | | |
| 10 | 27.985 | 3.655 | 1.81264 | 25.2 |
| 11 | 104.837 | D11 | | |
| 12 | −34.417 | 1.128 | 1.80810 | 46.3 |
| 13 | 62.455 | 2.575 | 1.81264 | 25.2 |
| 14 | −333.098 | D14 | | |
| 15 | ∞ (stop) | 2.509 | | |
| 16 | ∞ | 7.874 | 1.62286 | 60.1 |
| 17 | −38.838 | 0.263 | | |
| 18 | 136.253 | 4.557 | 1.51872 | 64.0 |
| 19 | −136.253 | 0.113 | | |
| 20 | 55.611 | 11.632 | 1.48914 | 70.2 |
| 21 | −32.030 | 1.503 | 1.80922 | 39.3 |
| 22 | 125.415 | 6.013 | | |
| 23 | 27.815 | 9.518 | 1.62286 | 60.1 |
| 24 | ∞ | 0.132 | | |
| 25 | 27.019 | 7.536 | 1.48914 | 70.2 |
| 26 | −169.992 | 1.503 | 1.80922 | 39.3 |
| 27 | 15.559 | 10.167 | | |
| 28 | 38.291 | 4.764 | 1.62286 | 60.1 |
| 29 | −38.291 | 19.213 | | |
| 30 | ∞ | 5.000 | 1.51824 | 63.9 |
| 31 | ∞ (image) | | | |

Table 10 below lists at both the wide-angle end (WIDE) and telephoto end (TELE) for Embodiment 3 of the present invention: the focal length f (in mm); the F-number $F_{NO}$ with the diaphragm stop fully open; and the on-axis spacings D5, D11 and D14 (in mm) between the lens groups. Also, for the wide-angle end of Embodiment 3 are listed: the back focus Bf (in mm) of the zoom lens; the back focus $Bf_{4b}$ of the rear subgroup of the fourth lens group; the ratio $Bf_{4b}/Bf$; the maximum ray height Ha on the image-side surface immediately before the movable component(s) of the fourth lens group (in this case, the surface of radius of curvature $R_{27}$) at the wide-angle end when the diaphragm stop is fully open; the maximum ray height Hb on the lens surface of the movable component(s) of the fourth lens group nearest the object side (in this case, the surface of radius of curvature $R_{28}$) at the wide-angle end when the diaphragm stop is fully open; the absolute value of Ha minus Hb; the value 0.02 $Bf/F_N$; and the amount of shift (in mm) in focal point position when the rear subgroup IVb is moved 1 mm toward the image so as to adjust the back focus. In the bottom portion of the table are listed the screen size (in mm) for which the zoom lens of Embodiment 3 is designed, as well as the diameter of the diaphragm stop (in mm) when fully open.

TABLE 10

| | WIDE | TELE |
|---|---|---|
| f | 8.5 | 170 |
| $F_{NO}$ | 1.25 | 2.77 |
| D5 | 0.94 | 72.842 |
| D11 | 69.425 | 10.112 |
| D14 | 16.546 | 3.956 |
| Bf | 22.507 | |
| $Bf_{4b}$ | 29.986 | |
| $Bf_{4b}/Bf$ | 1.332 | |

TABLE 10-continued

| | WIDE | TELE |
|---|---|---|
| Ha | 10.783 | |
| Hb | 10.557 | |
| Ha − Hb | 0.226 | |
| 0.02 Bf/Fn | 0.360 | |
| Focal point shift | 0.943 | |

Screen size: Φ = 8.0
Diaphragm stop diameter when fully open = 36.011

As is apparent from Table 10, the zoom lens of Embodiment 3 satisfies the above Conditions (1) and (2).

Figure 13A:
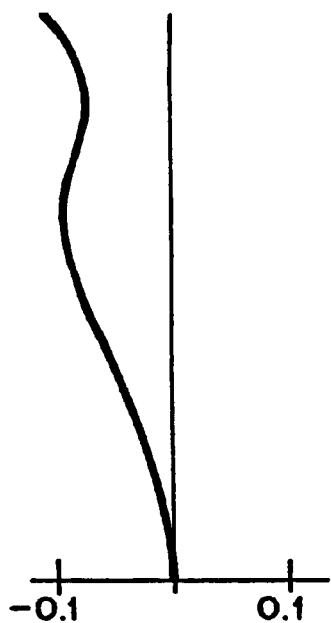
FIGS. 13(a) and 13(b) show the spherical aberration and astigmatism, respectively, of the zoom lens of Embodiment 3 at the wide-angle end.
Figure 13B:
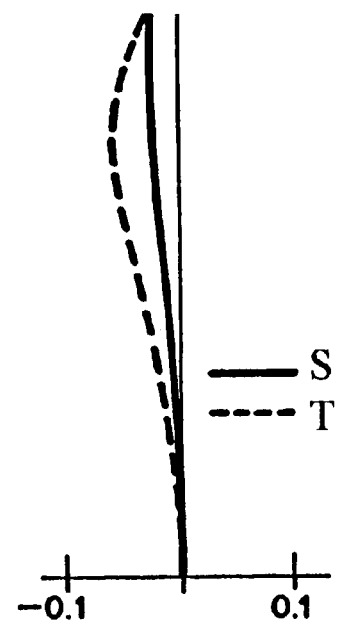
Figure 14:
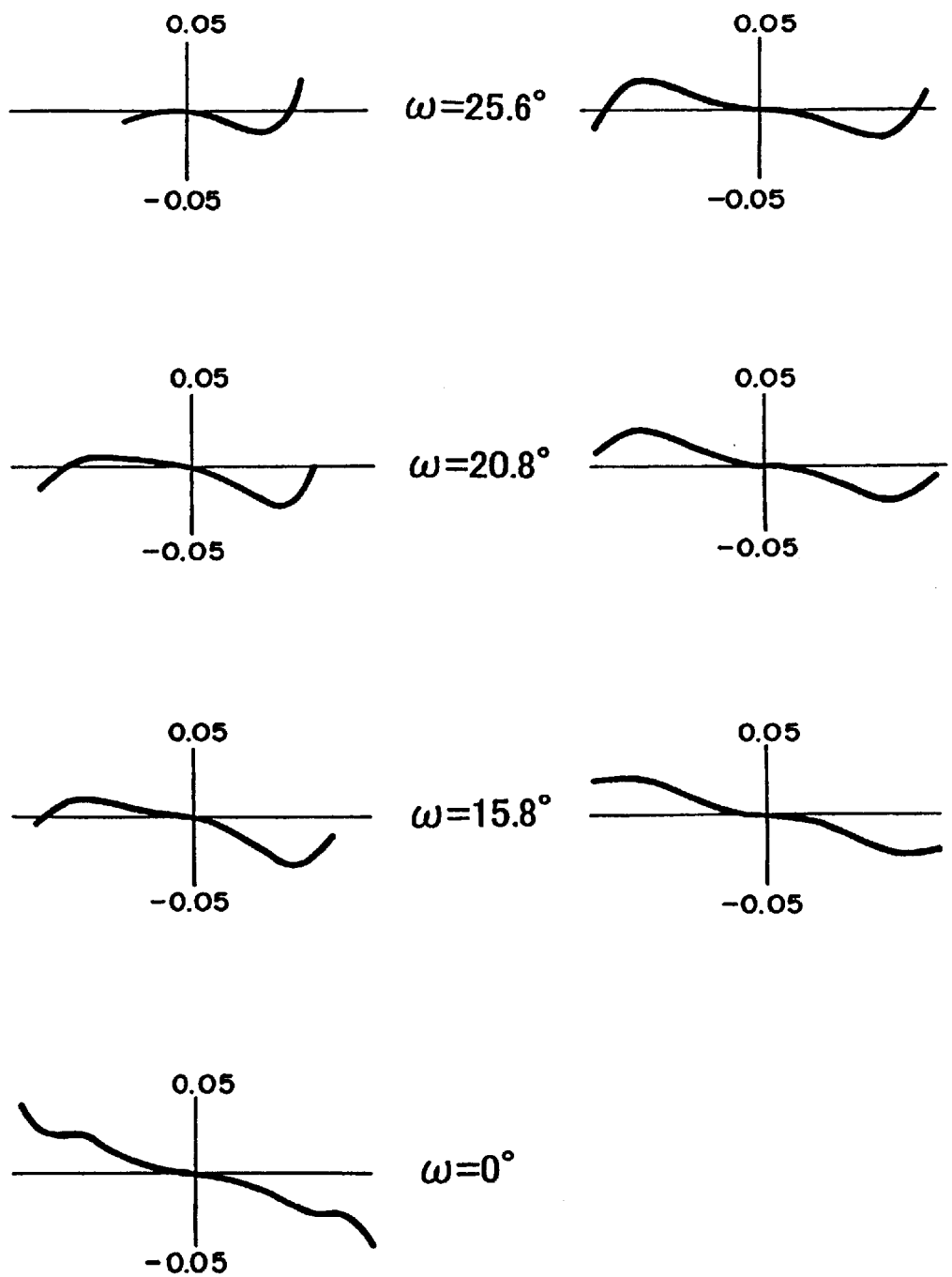
FIG. 14 shows the coma of the zoom lens of Embodiment 3 at the wide-angle end for field angles ω equal to 0, 15.8, 20.8, and 25.6 degrees for both the tangential (left column) and sagittal (right column) image surfaces.
Figure 15A:
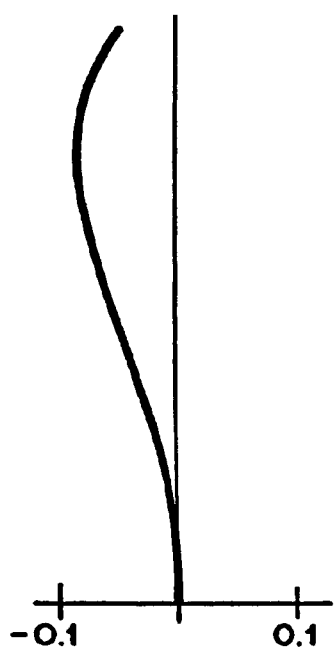
FIGS. 15(a) and 15(b) show the spherical aberration and astigmatism, respectively, of the zoom lens of Embodiment 3 at the telephoto end.
Figure 15B:
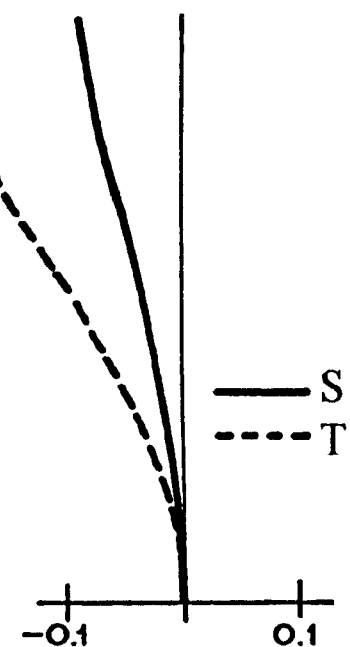
Figure 16:
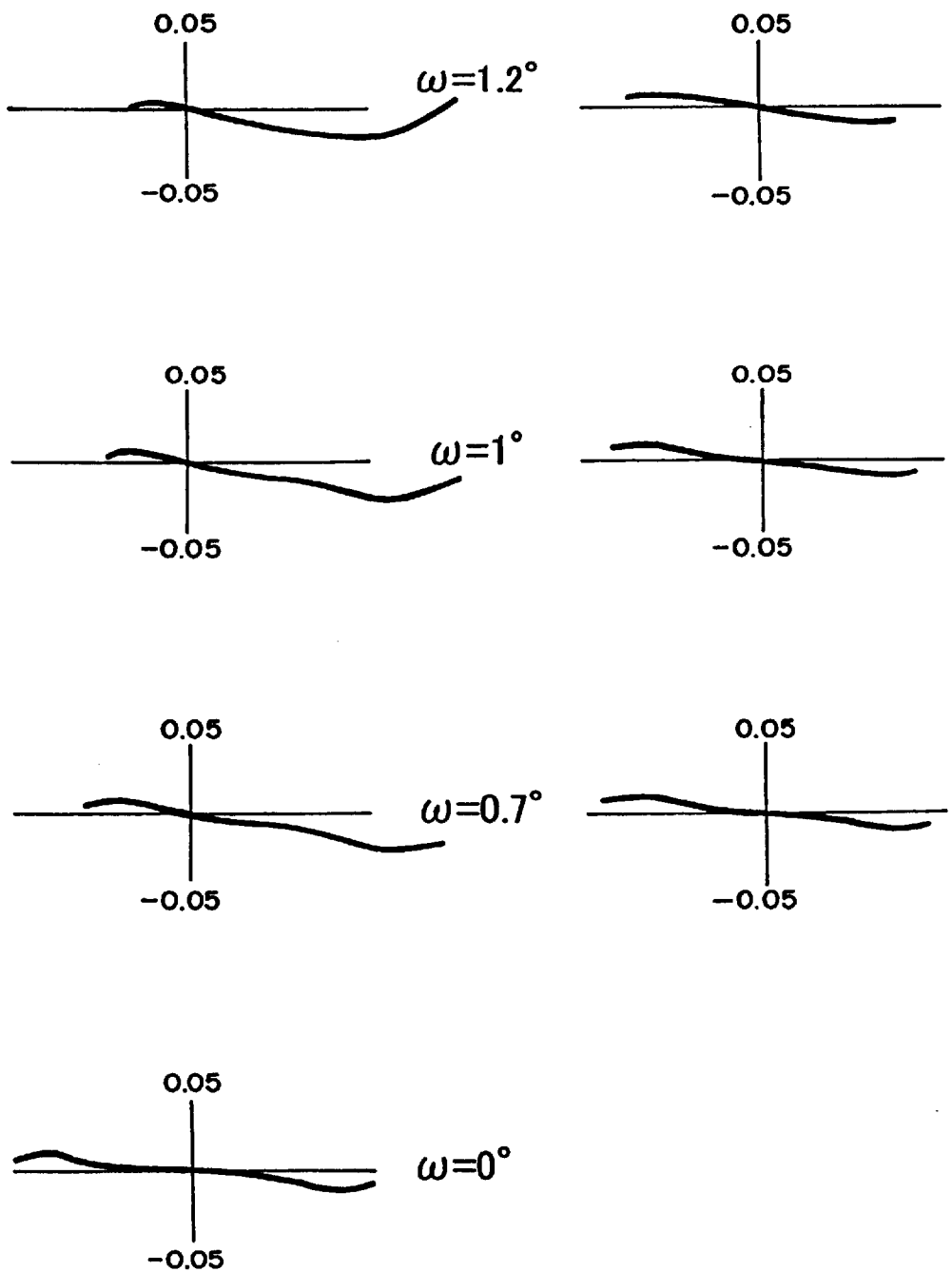
FIG. 16 shows the coma of the zoom lens of Embodiment 3 at the telephoto end for field angles ω equal to 0, 0.7, 1.0, and 1.2 degrees for both the tangential (left column) and sagittal (right column) image surfaces.
Figure 17:
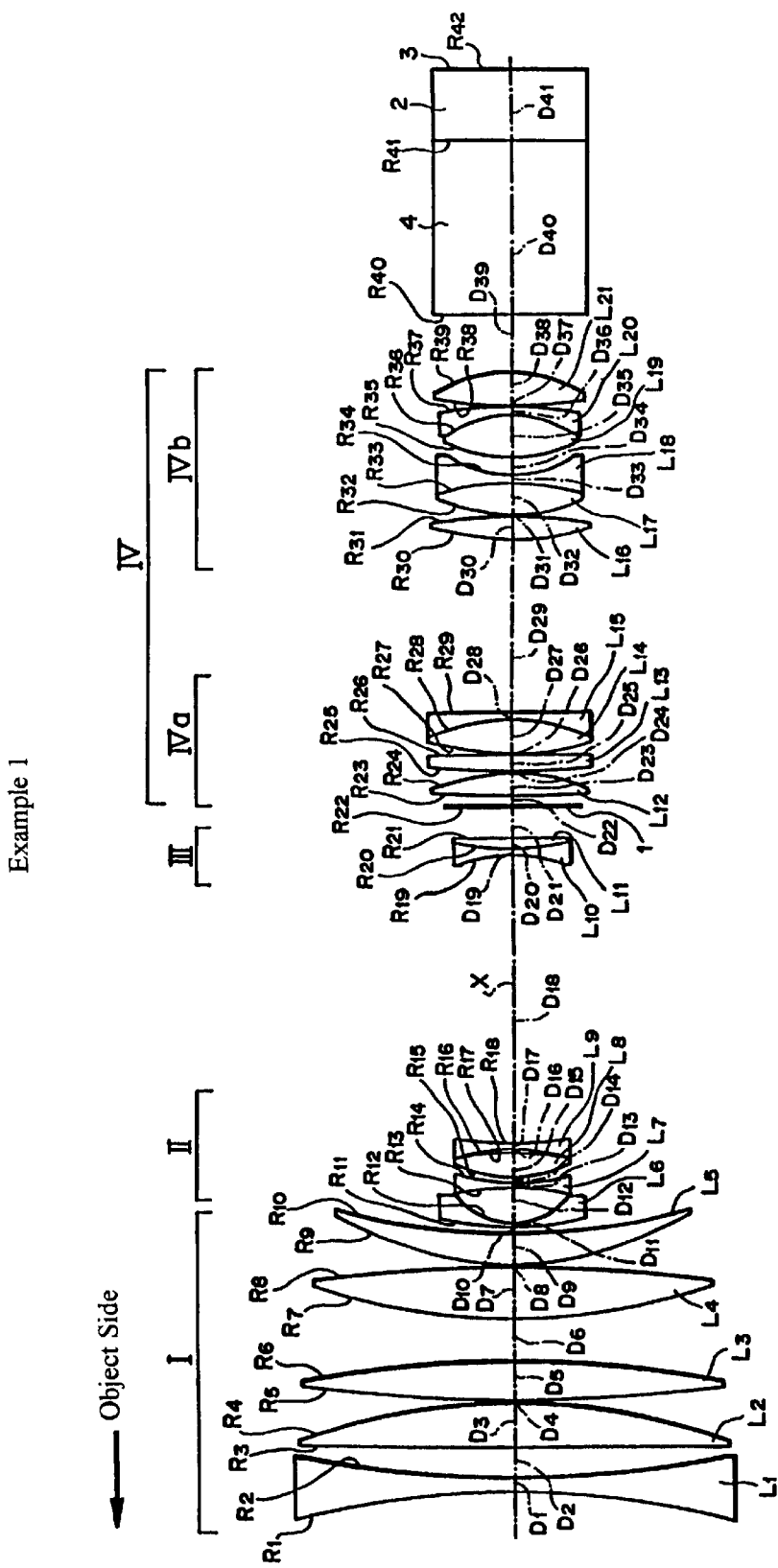
FIG. 17 shows the basic lens element configuration of Prior Art Example 1.
Figure 18:
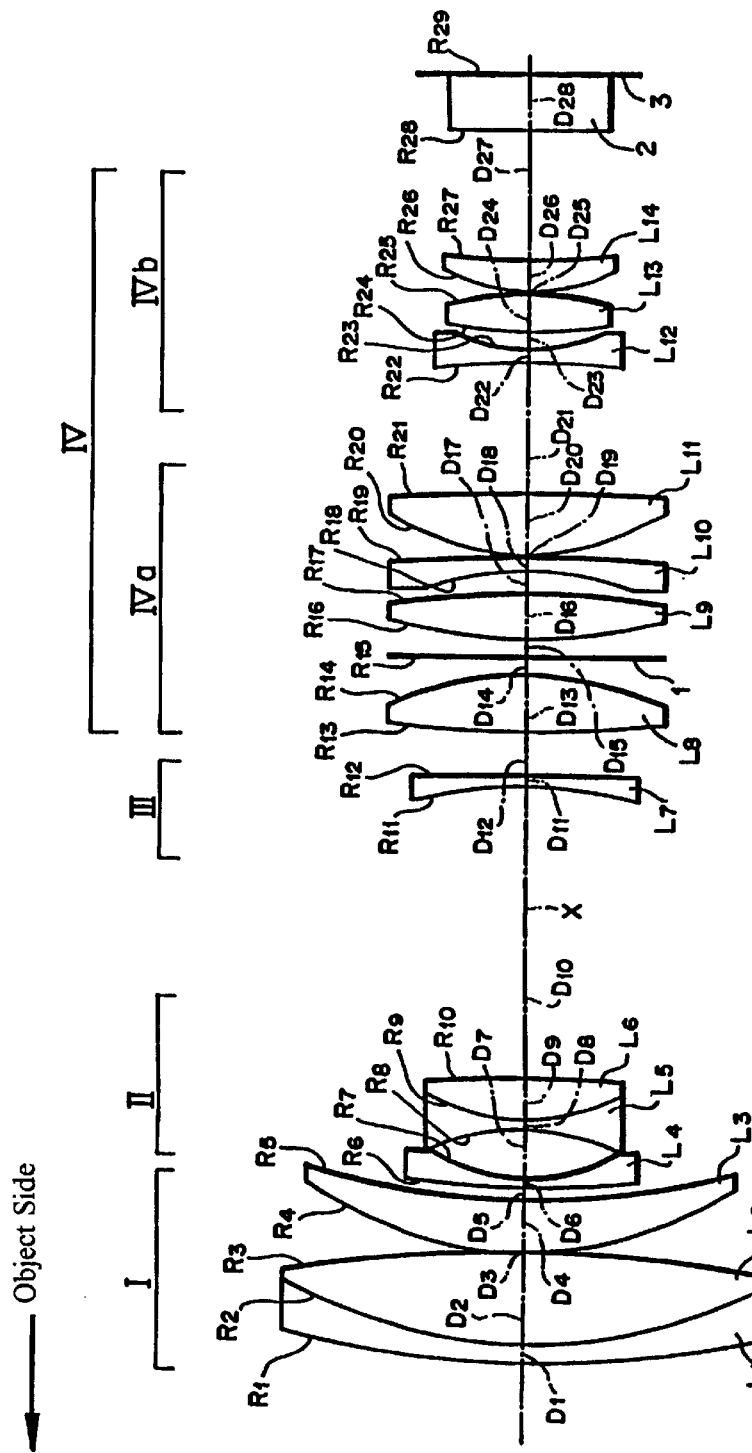
FIG. 18 shows the basic lens element configuration of Prior Art Example 2.

FIGS. 13(a) to 16 show aberrations of the zoom lens of Embodiment 3 with the distance to an object being 12 m. FIGS. 13(a) and 13(b) show the spherical aberration and astigmatism, respectively, at the wide-angle end. FIG. 14 shows the coma at the wide-angle end at field angles ω of 0, 15.8, 20.8 and 25.6 degrees, for both the tangential image plane (left column) and the sagittal image plane (right column), with the vertical axis dimension being in mm. As the coma on axis (ω=0°) is the same for both the tangential and sagittal image planes, only the curve for the tangential image plane is illustrated in the bottom row. FIGS. 15(a) and 15(b) show the spherical aberration and astigmatism, respectively, at the telephoto end. In FIGS. 13(b) and 15(b), the astigmatism is shown for both the sagittal (S) and tangential (T) image planes. FIG. 16 shows the coma at the telephoto end at field angles of 0, 0.7, 1.0 and 1.2 degrees, for both the tangential image plane (left column) and the sagittal image plane (right column), with the vertical axis dimension being in mm. Once again, only a single curve is illustrated in the bottom row, for the reason discussed above.

As is apparent from FIGS. 13(a) to 16, the zoom lens of Embodiment 3, which has a simple and compact configuration of the lens subgroup that is moved for adjusting the back focus, has its aberrations corrected as satisfactorily as Prior Art Example 1 which has a more complex configuration.

As described above, each of Embodiments 1 to 3 (designed for screen sizes of 16.0 mm, 11.0 mm, and 8.0 mm, respectively) has its aberrations corrected as satisfactorily as that of Prior Art Example 1 which has a more complex lens configuration.

The invention being thus described, it will be obvious that the same may be varied in many ways. For example, the shapes and number of lenses forming each lens group can be appropriately modified. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens having only four lens groups, in order from the object side, as follows:

a first lens group having positive refractive power;

a second lens group having negative refractive power and which moves for changing magnification when zooming;

a third lens group having negative refractive power and which moves for correcting what would otherwise be a shift in the image surface position when zooming; and a fourth lens group having positive refractive power and formed of a front subgroup and a rear subgroup, in order from the object side, with the rear subgroup consisting of a single positive lens element that moves to correct for different back focus lengths that are required when the zoom lens is mounted in different television cameras.

2. The zoom lens according to claim 1, wherein the following Condition (1) is satisfied:

$$1.0 < Bf_{4b}/Bf < 1.5 \qquad \text{Condition (1)}$$

where $Bf_{4b}$ is the back focus of the rear subgroup of the fourth lens group, and Bf is the back focus of the zoom lens.

3. The zoom lens according to claim 1, and further including a diaphragm stop positioned within the zoom lens, and wherein the following Condition (2) is satisfied:

$$|Ha-Hb| < 0.02\ Bf/Fn \qquad \text{Condition (2)}$$

where

Ha is the maximum ray height on the image-side surface immediately before the movable component(s) of the fourth lens group, at the wide-angle end when the diaphragm stop is fully open;

Hb is the maximum ray height on the lens surface of the movable component(s) of the fourth lens group nearest the object side, at the wide-angle end when the diaphragm stop is fully open;

Bf is the back focus of the zoom lens; and

Fn is the F-number of the zoom lens at the wide-angle end when the diaphragm stop is fully open.

4. The zoom lens according to claim 2, and further including a diaphragm stop positioned within the zoom lens, and wherein the following Condition (2) is satisfied:

$$|Ha-Hb| < 0.02\ Bf/Fn \qquad \text{Condition (2)}$$

where

Ha is the maximum ray height on the image-side surface immediately before the movable component(s) of the fourth lens group, at the wide-angle end when the diaphragm stop is fully open;

Hb is the maximum ray height on the lens surface of the movable component(s) of the fourth lens group nearest the object side, at the wide-angle end when the diaphragm stop is fully open;

Bf is the back focus of the zoom lens; and

Fn is the F-number of the zoom lens at the wide-angle end when the diaphragm stop is fully open.

5. The zoom lens according to claim 1, wherein the front subgroup of the fourth lens group is formed of, in order from the object side, a positive lens having a convex surface on the image side, a biconvex lens, a doublet formed of a positive lens that is joined to a negative lens, a positive lens having a convex surface on the object side, and a doublet formed of a positive lens that is joined to a negative lens.

6. The zoom lens according to claim 2, wherein the front subgroup of the fourth lens group is formed of, in order from the object side, a positive lens having a convex surface on the image side, a biconvex lens, a doublet formed of a positive lens that is joined to a negative lens, a positive lens having a convex surface on the object side, and a doublet formed of a positive lens that is joined to a negative lens.

7. The zoom lens according to claim 3, wherein the front subgroup of the fourth lens group is formed of, in order from the object side, a positive lens having a convex surface on the image side, a biconvex lens, a doublet formed of a positive lens that is joined to a negative lens, a positive lens having a convex surface on the object side, and a doublet formed of a positive lens that is joined to a negative lens.

8. The zoom lens according to claim 4, wherein the front subgroup of the fourth lens group is formed of, in order from the object side, a positive lens having a convex surface on the image side, a biconvex lens, a doublet formed of a positive lens that is joined to a negative lens, a positive lens having a convex surface on the object side, and a doublet formed of a positive lens that is joined to a negative lens.

9. The zoom lens according to claim 1, wherein:

the first lens group is formed of, in order from the object side, a doublet having a negative lens joined to a positive lens, and a positive meniscus lens with its convex surface on the object side;

the second lens group is formed of, in order from the object side, a negative lens element, a negative lens element, and a positive meniscus lens element with its convex surface on the object side; and the third lens group is formed of a doublet having, in order from the object side, a biconcave lens joined to a positive lens.

10. The zoom lens according to claim 2, wherein:

the first lens group is formed of, in order from the object side, a doublet having a negative lens joined to a positive lens, and a positive meniscus lens with its convex surface on the object side;

the second lens group is formed of, in order from the object side, a negative lens element, a negative lens element, and a positive meniscus lens with its convex surface on the object side; and the third lens group is formed of a doublet having, in order from the object side, a biconcave lens joined to a positive lens.

11. The zoom lens according to claim 3, wherein:

the first lens group is formed of, in order from the object side, a doublet having a negative lens joined to a positive lens, and a positive meniscus lens with its convex surface on the object side;

the second lens group is formed of, in order from the object side, a negative lens element, a negative lens element, and a positive meniscus lens with its convex surface on the object side; and the third lens group is formed of a doublet having, in order from the object side, a biconcave lens joined to a positive lens.

12. The zoom lens according to claim 4, wherein:

the first lens group is formed of, in order from the object side, a doublet having a negative lens joined to a positive lens, and a positive meniscus lens with its convex surface on the object side;

the second lens group is formed of, in order from the object side, a negative lens element, a negative lens element, and a positive meniscus lens with its convex surface on the object side; and the third lens group is formed of a doublet having, in order from the object side, a biconcave lens joined to a positive lens.

13. The zoom lens according to claim 5, wherein:

the first lens group is formed of, in order from the object side, a doublet having a negative lens joined to a positive lens, and a positive meniscus lens with its convex surface on the object side;

the second lens group is formed of, in order from the object side, a negative lens element, a negative lens element, and a positive meniscus lens with its convex surface on the object side; and the third lens group is formed of a doublet having, in order from the object side, a biconcave lens joined to a positive lens.

14. The zoom lens according to claim 6, wherein:

the first lens group is formed of, in order from the object side, a doublet having a negative lens joined to a positive lens, and a positive meniscus lens with its convex surface on the object side;

the second lens group is formed of, in order from the object side, a negative lens element, a negative lens element, and a positive meniscus lens with its convex surface on the object side; and the third lens group is formed of a doublet having, in order from the object side, a biconcave lens joined to a positive lens.

15. The zoom lens according to claim 7, wherein:

the first lens group is formed of, in order from the object side, a doublet having a negative lens joined to a positive lens, and a positive meniscus lens with its convex surface on the object side;

the second lens group is formed of, in order from the object side, a negative lens element, a negative lens element, and a positive meniscus lens with its convex surface on the object side; and the third lens group is formed of a doublet having, in order from the object side, a biconcave lens joined to a positive lens.

16. The zoom lens according to claim 8, wherein:

the first lens group is formed of, in order from the object side, a doublet having a negative lens joined to a positive lens, and a positive meniscus lens with its convex surface on the object side;

the second lens group is formed of, in order from the object side, a negative lens element, a negative lens element, and a positive meniscus lens with its convex surface on the object side; and the third lens group is formed of a doublet having, in order from the object side, a biconcave lens joined to a positive lens.

* * * * *